US012720452B2

(12) United States Patent
Wu

(10) Patent No.: US 12,720,452 B2
(45) Date of Patent: Aug. 25, 2026

(54) METHOD OF TRANSMITTING SYNCHRONOUS SIGNAL BLOCK SSB, TERMINAL DEVICE, AND NETWORK DEVICE

(71) Applicant: GUANGDONG OPPO MOBILE TELECOMMUNICATIONS CORP., LTD., Dongguan (CN)

(72) Inventor: Zuomin Wu, Dongguan (CN)

(73) Assignee: GUANGDONG OPPO MOBILE TELECOMMUNICATIONS CORR, LTD., Dongguan (CN)

( * ) Notice: Subject to any disclaimer, the term of this patent is extended or adjusted under 35 U.S.C. 154(b) by 723 days.

(21) Appl. No.: 18/090,330

(22) Filed: Dec. 28, 2022

(65) Prior Publication Data

US 2023/0224836 A1 Jul. 13, 2023

Related U.S. Application Data

(63) Continuation of application No. PCT/CN2020/121692, filed on Oct. 16, 2020.

(51) Int. Cl.
*H04W 56/00* (2009.01)
*H04W 16/28* (2009.01)

(52) U.S. Cl.
CPC ....... *H04W 56/0015* (2013.01); *H04W 16/28* (2013.01)

(58) Field of Classification Search
CPC ............. H04W 56/0015; H04W 16/28; H04W 56/001; H04W 72/04; H04W 72/0453;
(Continued)

(56) References Cited

U.S. PATENT DOCUMENTS

2021/0160022 A1 5/2021 Cha et al.
2024/0163682 A1* 5/2024 Si .......................... H04W 16/14

FOREIGN PATENT DOCUMENTS

CN 110235477 A 9/2019
CN 110249582 A 9/2019
(Continued)

OTHER PUBLICATIONS

Qualcomm Incorporated, Feature lead summery on initial access signals and channels for NR-U, 3GPP TSG RAN WG1 Meeting AH1901, R1-1901332, Jan. 21-Jan. 25, 2019. (31 pages).
(Continued)

*Primary Examiner* — Eric Myers
(74) *Attorney, Agent, or Firm* — Young Basile Hanlon & MacFarlane, P.C.

(57) ABSTRACT

Provided are a synchronization signal block (SSB) transmission method, a terminal device, a network device and a computer-readable storage medium. After a quasi co-location (QCL) relationship indication is introduced into a high frequency, an SSB or an SSB index, which corresponds to one beam, in a high-frequency SSB burst set are sent by at least one of a plurality of candidate SSB positions. The embodiments of the present invention may comprise: a terminal device determining an SSB burst set, wherein the SSB burst set comprises N candidate SSB positions, each of the N candidate SSB positions corresponds to one candidate SSB index, and N is an integer greater than 20; and the terminal device determining, according to first indication information, a QCL relationship of N candidate SSB indexes.

15 Claims, 7 Drawing Sheets

Network device

Terminal device 301, transmitting first indication information 302, the terminal device determines the SSB burst set 303, the terminal device determines a QCL relationship for the N candidate SSB indexes based on the first indication information 304, transmitting second indication information

(58) Field of Classification Search
CPC ..... H04L 5/005; H04L 5/0094; H04L 5/0053; H04B 7/06968
See application file for complete search history.

(56) References Cited

FOREIGN PATENT DOCUMENTS

| | | | |
|---|---|---|---|
| CN | 111182562 | A | 5/2020 |
| CN | 111294943 | A | 6/2020 |
| WO | 2019097482 | A1 | 5/2019 |
| WO | 2019203526 | A1 | 10/2019 |

OTHER PUBLICATIONS

Extended European Search Report for EP Application 20957286.6 mailed Oct. 30, 2023. (9 pages).
International Search Report and Written Opinion with English Translation for PCT Application PCT/CN2020/121692 mailed Jul. 15, 2021. (13 pages).
Spreadtrum Communications., Discussion on initial access and mobility in NR-U, 3GPP TSG RAN WG1 Meeting #97, R1-1906375, 13th-17th, 2019. (13 pages).
LG Electronics, Consideration on required physical layer changes to support NR above 52.6 Ghz, 3GPP TSG RAN WG1 #102-e, R1-2006304, 17th-28th, 2020. (9 pages).

* cited by examiner

METHOD OF TRANSMITTING SYNCHRONOUS SIGNAL BLOCK SSB, TERMINAL DEVICE, AND NETWORK DEVICE

CROSS-REFERENCE TO RELATED APPLICATION(S)

The present application is a continuation-application of the international patent application No. PCT/CN2020/121692, filed on Oct. 16, 2020, the entire contents of which are incorporated herein by reference.

TECHNICAL FIELD

The present disclosure relates to the field of communication, and in particular to a method of transmitting a synchronous signal block SSB, a terminal device, and a network device.

BACKGROUND

When a new radio (NR) system is deployed in high frequency, since a FRX band includes a non-shared spectrum and a shared spectrum, transmitting a synchronization signal block (SSB) on the shared spectrum may require a plurality of candidate locations, such that a network device may transmit the SSB through at least one of the plurality of candidate locations after successful Listen Before Talk (LBT). Since the high frequency includes 64 SSBs, or even a larger number of SSBs, such as 128 SSBs, may be introduced. In this case, how to define a Quasi Co-Location (QCL) relationship may be an issue to be addressed.

SUMMARY

According to a first aspect, the present disclosure provides a method of transmitting a synchronous signal block (SSB), including: determining, by a terminal device, an SSB burst set, wherein the SSB burst set comprises N candidate SSB locations, each of the N candidate SSB locations corresponds to one candidate SSB index, the N is an integer greater than 20; and determining, by the terminal device, a quasi co-location (QCL) relationship of the N candidate SSB indexes based on the first indication information.

According to a second aspect, the present disclosure provides a method of transmitting a synchronous signal block (SSB), including: transmitting, by a network device, first indication information to a terminal device, wherein the first indication information is configured to determine a quasi co-location (QCL) relationship of the N candidate SSB indexes, the N candidate SSB indexes correspond to N candidate SSB locations, the N is an integer greater than 20.

According to another aspect, the present disclosure provides a terminal device. After the QCL relationship indication is introduced into the high frequency, in the SSB burst set in the high frequency, SSBs or SSB indexes corresponding to one beam may be transmitted through at least one of a plurality of candidate SSB locations, such that more SSB transmission opportunities are available in the network, performance of an initial access of the terminal device and performance of measurement of the terminal device may be improved. These functions may be implemented by hardware or by hardware executing corresponding software. The hardware or software comprises one or more modules corresponding to the above functions.

According to still another aspect, the present disclosure provides a network device. After the QCL relationship indication is introduced into the high frequency, in the SSB burst set in the high frequency, SSBs or SSB indexes corresponding to one beam may be transmitted through at least one of a plurality of candidate SSB locations, such that more SSB transmission opportunities are available in the network, performance of an initial access of the terminal device and performance of measurement of the terminal device may be improved. These functions may be implemented by hardware or by hardware executing corresponding software. The hardware or software comprises one or more modules corresponding to the above functions.

According to still another aspect, the present disclosure provides a terminal device including: a memory which stores executable program codes, and a processor and a transceiver coupled to the memory. The processor and the transceiver are configured to correspondingly execute the method described in the first aspect of the present disclosure.

According to still another aspect, the present disclosure provides a network device including: a memory which stores executable program codes and a transceiver coupled to the memory. The transceiver is configured to correspondingly execute the method described in the second aspect of the present disclosure.

According to still another aspect, the present disclosure provides a computer-readable storage medium including instructions. When the instructions are being run on a computer, the instructions may cause the computer to perform the method as described in the first aspect or the second aspect of the present disclosure.

According to still another aspect, the present disclosure provides a computer program product that includes instructions. When the computer program product is being run on a computer, the instructions may cause the computer to perform the method as described in the first aspect or the second aspect of the present disclosure.

According to still another aspect, the present disclosure provides a chip. The chip is coupled to the memory in the terminal device, such that the chip may invoke, while being operating, program instructions stored in the memory to cause the terminal device to perform the method as described in the first aspect of the present disclosure.

According to still another aspect, the present disclosure provides a chip. The chip is coupled to the memory in the network device, such that the chip may invoke, while being operating, program instructions stored in the memory to cause the terminal device to perform the method as described in the second aspect of the present disclosure.

DETAILED DESCRIPTION

Figure 1A:
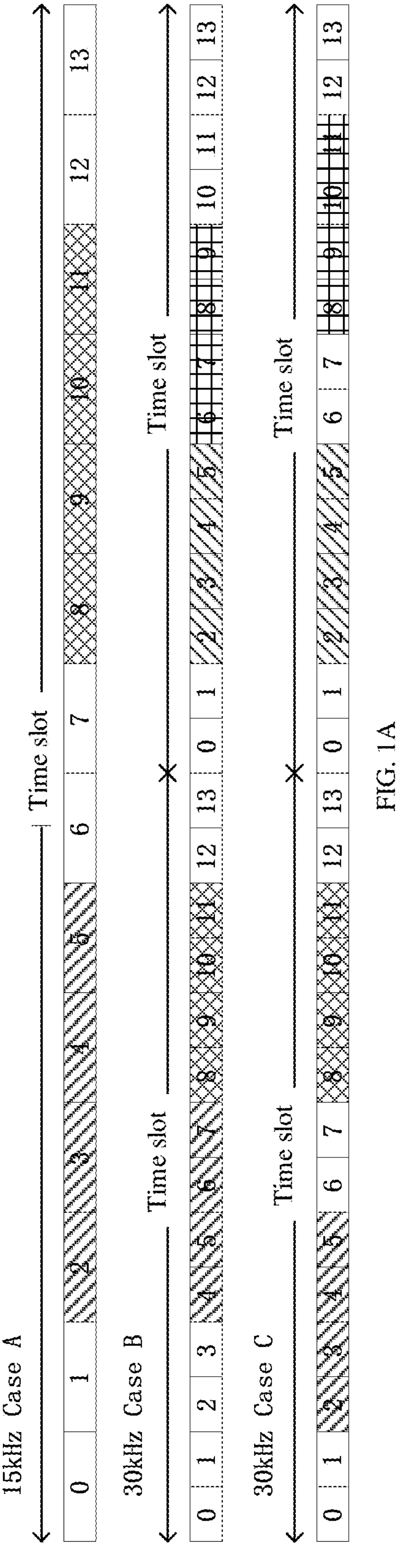
FIG. 1A is a schematic view of a partial SSB pattern with respect to FR1 in a NR system under different circumstances.

Technical solutions in the embodiments of the present disclosure will be described below by referring to the accompanying drawings in the embodiments of the present disclosure. Apparently, the described embodiments are only some of but not all of the embodiments of the present disclosure. All other embodiments, which are obtained by any ordinary skilled person in the art without making creative work and based on the embodiments in the present disclosure, shall fall within the scope of the present disclosure.

Background related to a high frequency involved in the present disclosure will be briefly described in the following.

1. Background Related to the High Frequency

In the New radio (NR) system research, two frequency bands, a band FR1 (Frequency range 1) and a band FR2 (Frequency range 2), are considered currently. Frequency domain ranges included in the FR1 and the FR2 are shown in the following Table 1.

| Frequency band definition | Corresponding Frequency band ranges |
|---|---|
| FR1 | 410 MHz-7.125 GHz |
| FR2 | 24.25 GHz-52.6 GHz |

As the NR system evolves, technologies about new frequency bands, i.e., high frequencies, are being studied. A frequency domain range included in the new frequency bands is shown in Table 2 and is denoted by FRX in the present disclosure for description. It shall be understood that a name of the frequency band shall not have any limitation.

| High frequency | Corresponding Frequency band ranges |
|---|---|
| FRX | 52.6 GHz-71 GHz |

The FRX band includes a licensed spectrum and an unlicensed spectrum. In other words, the FRX band includes a non-shared spectrum and a shared spectrum. The non-licensed spectrum is a spectrum that can be used by a radio device for communication and is defined by nations and regions. The spectrum is usually considered as the shared spectrum. That is, communication devices in different communication systems can use the spectrum, as long as they meet regulatory requirements set by the nations or the regions on the spectrum, and the communication devices do not need to apply to the government for any exclusive spectrum authorization.

In order to enable various communication systems, which use the unlicensed spectrum for wireless communication, to be friendly co-available on the spectrum, some nations or regions have set regulatory requirements that must be met in order to use the unlicensed spectrum. For example, a communication device follows the "Listen Before Talk (LBT)" principle. That is, the communication device needs to listen to a channel before transmitting signals on the channel of the unlicensed spectrum. Only when a listening result indicates that the channel is free, the communication device may transmit signals. In response to the listening result indicating that the channel of the unlicensed spectrum is busy, the communication device cannot transmit the signals. In another example, in order to ensure fairness, a time length that the communication device spends on transmitting signals using the channel of the unlicensed spectrum cannot exceed a certain time length. In another example, in order to prevent a power that is consumed to transmit signals through the channel of the unlicensed spectrum from being excessively high and from affecting transmission of other important signals on the channel, the power that the communication device consumes to transmit signals through the channel of the unlicensed spectrum shall not exceed a maximum power spectrum density.

A subcarrier spacing considered for the FRX band is greater than that considered for the FR2. In the art, candidate subcarrier spacings include at least one of the following: 240 kHz, 480 kHz, 960 kHz, 1.92 MHz, and 3.84 MHz. For example, corresponding parameter sets (Numerology) under the candidate subcarrier spacings are shown in Table 3 below.

| subcarrier spacing | Symbol length | Normal CP length | Extended CP length | Time slot length |
|---|---|---|---|---|
| 240 kHz | 4.16 us | 0.292 us | 1.04 us | 62.5 us |
| 480 kHz | 2.08 us | 0.146 us | 0.52 us | 31.25 us |
| 960 kHz | 1.04 us | 0.073 us | 0.26 us | 15.625 us |
| 1.92 MHz | 0.52 us | 0.037 us | 0.13 us | 7.8125 us |
| 3.84 MHz | 0.26 us | 0.018 us | 0.065 us | 3.90625 us |

2. NR Synchronization Signal Block (SSB) Pattern

In the NR system, a synchronization signal block (SSB or PBCH block) pattern supported by the FR1 includes 3 cases (Case A, Case B, and Case C), and a SSB pattern supported by the FR2 includes 2 cases (Case D and Case E). One SSB transmission opportunity may include one or more SSBs, one SSB includes 4 symbols in a time domain, and transmitting a set of SSBs should be completed within a half frame (5 ms). For example, when an index of a first symbol of a first time slot within the half frame is a symbol 0, following cases may occur.

(1) Case A-15 kHz subcarrier spacing:

1) the index of the first symbol of the SSB includes {2,8}+14*n; and

2) For a non-shared spectrum:

① a carrier frequency is less than or equal to 3 GHz, n=0,1; and

② a carrier frequency within the FR1 is greater than 3 GHz, n=0,1,2,3.

3) For the shared spectrum, n=0,1,2,3,4.

(2) Case B-30 kHz subcarrier spacing:

1) The index of the first symbol of the SSB includes {4,8,16,20}+28*n;

① a carrier frequency is less than or equal to 3 GHz, n=0; and

② a carrier frequency within the FR1 is greater than 3 GHz, n=0,1.

(3) Case C-30 kHz subcarrier spacing:

1) The index of the first symbol of the SSB includes {2,8}+14*n;

2) For the non-shared spectrum and paired spectra (such as in a frequency division duplex (FDD) scenario):

① a carrier frequency is less than or equal to 3 GHz, n=0,1;

② a carrier frequency within the FR1 is greater than 3 GHz, n=0,1,2,3;

3) For the non-shared spectrum and a non-paired spectrum (such as in a time division duplex (TDD) scenario);

① a carrier frequency is less than or equal to 2.4 GHz, n=0,1; and

② a carrier frequency within the FR1 is greater than 2.4 GHz, n=0,1,2,3.

FIG. 1A is a schematic view of a partial SSB pattern with respect to FR1 in a NR system under different circumstances.

4) For the shared spectrum, n=0,1,2,3,4,5,6,7,8,9.

(4) Case D-120 kHz subcarrier spacing:

1) The index of the first symbol of the SSB includes {4,8,16,20}+28*n;

① For carrier frequencies within the FR2, n=0,1,2,3,5,6,7,8,10,11,12,13,15,16,17,18.

(5) Case E-240 kHz subcarrier spacing:

1) The index of the first symbol of the SSB includes {8,12,16,20,32,36,40,44}+56*n;

① For carrier frequencies within the FR2, n=0,1,2,3,5, 6,7,8.

Figure 1B:
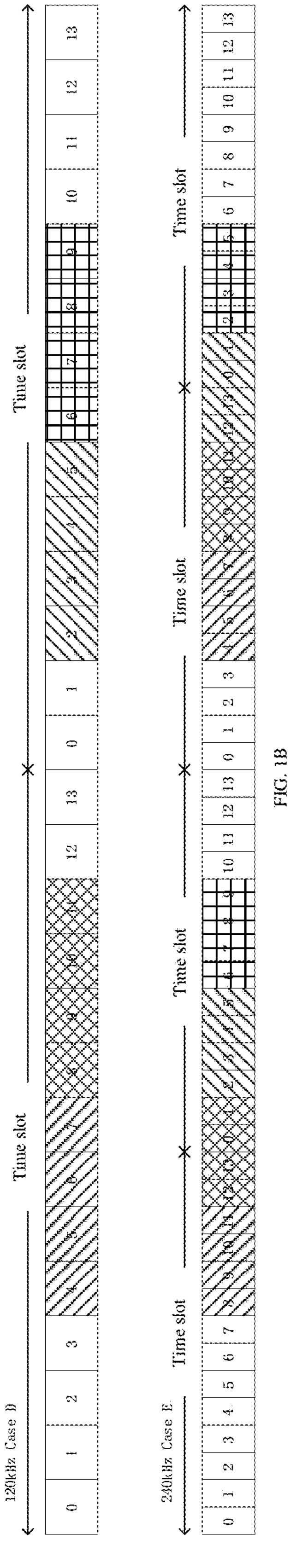
FIG. 1B is a schematic view of a partial SSB pattern with respect to FR2 in a NR system under different circumstances.

FIG. 1B is a schematic view of a partial SSB pattern with respect to FR2 in a NR system under different circumstances.

3. SSB Transmission in the NR System

In the NR system, for the FR1 band, one SSB burst set may include at most 8 SSBs, and at most 3 bits are required to indicate indexes of the 8 SSB. The 3 bits are implicitly carried by a demodulation reference signal (DMRS) sequence of a physical broadcast channel (PBCH). 8 different DMRS sequences of the PBCH may be available and corresponds to 8 different SSB indexes. The FR2 band is at a higher frequency, and therefore, beam energy may be more concentrated and accordingly a coverage angle of a single beam may be smaller in order to guarantee long-distance transmission of signals. Therefore, an increased number of beams are required to ensure cell coverage. At present, up to 64 SSBs may be configured in the FR2 band, and 6 bits are required to indicate indexes of the 64 SSBs. Low 3 bits of the 6 bits are carried by the DMRS sequence of the PBCH, and the other high 3 bits are indicated directly by load content of the PBCH.

One of main functions of the SSB indexes is to allow a user equipment (UE) to obtain system timing information. In addition, the SSB indexes are further configured to indicate the Quasi Co-Location (QCL) relationship between SSBs. The QCL relationship between signals is used to describe how large-scaled parameters of the signals are similar to each other. Two signals having the QCL relationship may indicate that the two signals have similar large-scaled parameters. Specifically, for the SSBs, SSBs carried different beams in the 5G NR system may form one SSB burst set. Different SSB indexes correspond to time-domain location information of different SSBs in the SSB burst set and correspond to specific SSB transmission beam information. SSBs having a same SSB index may be determined to have the QCL relationship with each other. The UE may assume that a base station takes one beam to transmit the SSBs having the QCL relationship. SSBs corresponding to different SSB indexes may not be determined to have the QCL relationship with each other. This is because these SSBs may come from transmission beams of different base stations and experience different channel transmission characteristics.

For the FR1, a network device takes a complete bitmap to indicate a SSB index that is actually transmitted. One bit in the bitmap corresponds to one SSB index. A value of the one bit being "1" indicates that the network device has sent the SSB, and the value of the one bit being "0" indicates that the network device has not sent the SSB.

For the FR2, when the network device indicates the transmitted SSB index through a SIB1, for example, when the network device takes a position indication of the SSB of the SIB1 in the SSB burst set (ssb-PositionsInBurst) to provide the corresponding configuration information, in order to save signaling overhead, candidate locations of transmitting the SSB are grouped. Further, a group having actual SSB transmission may be indicated based on a group bitmap, and a location having actual SSB transmission within each group having the actual SSB transmission may be indicated based on an inner group bitmap. Locations of the actually transmitted SSBs within each of groups having the actual SSB transmission are the same. Specifically, the 64 Candidate SSB locations are grouped into 8 groups. Each of the 8 groups includes 8 SSBs. Therefore, a total of 8 bits are required to indicate the groups, and another 8 bitmaps indicate the locations of the transmitted SSB in the 8 groups. In this way, a total of 16 indicating bits are required. For example, when a group bitmap, such as a groupPresence, is "11000000", it means that SSBs in a group 0 (SSB indexes from 0 to 7) and in a group 1 (SSB indexes from 8 to 15) are transmitted based on instructions in the group bitmap. When the inner group bitmap, such as an inOneGroup, is "11001100", it means that SSBs are present at the 0th, the 1st, the 4th, and the 5th transmission candidate locations in the group 0 and at the 0th, the 1st, the 4th, and the 5th transmission candidate locations in the group 1 for being transmitted. That is, in the example, the SSBs transmitted by the network device are indexed as a SSB0, a SSB1, a SSB4, a SSB5, a SSB8, a SSB9, a SSB12, and a SSB13. When the network device indicates the transmitted SSB through the configuration information of a serving cell, for example, when the network device takes the ssb-PositionsInBurst in a serving cell common configuration indication (such as ServingCellConfigCommon) to provide the corresponding configuration information, a complete bitmap, i.e., 64 bits, may be used to indicate the indexes of the transmitted SSBs. The terminal device may expect that the configuration information provided by the ssb-PositionsInBurst in the ServingCellConfigCommon is the same as the configuration information provided by the ssb-PositionsInBurst in the SIB1.

4. SSB Transmission in a NR-U System

In the NR-U system, an initial access process of the terminal device may be completed by detecting the SSB burst set in a discovery burst window. The discovery burst window occurs periodically. The discovery burst window may include a plurality of candidate locations for transmitting the SSB. When the network device sends the SSB in the discovery burst window, the network device may perform a plurality of LBT attempts. After a successful LBT, the network device may transmit the SSB through at least one candidate location of the plurality of candidate locations. In different discovery burst windows, the base station may select, based on a LBT result, a candidate location, which has authorization of using a channel, from the Candidate SSB locations within the discovery burst window for transmitting the SSB.

A length of the discovery burst window on a carrier in the unlicensed spectrum may be configured by the network device. For example, for one service cell, the terminal device may determine the length of the discovery burst window based on indication information from the network device, such as indication information of DiscoveryBurst-WindowLength-r16. Alternatively, the length of the discovery burst window indicated by the indication information may be 0.5 ms, 1 ms, 2 ms, 3 ms, 4 ms, or 5 ms.

When the length of the discovery burst window is not configured for the terminal device by the network device, for example, when the terminal device is not provided with the indication information of DiscoveryBurst-WindowLength-r16, the terminal device may assume that the length of the discovery burst window is a half frame, i.e., 5 ms.

Figure 1C:
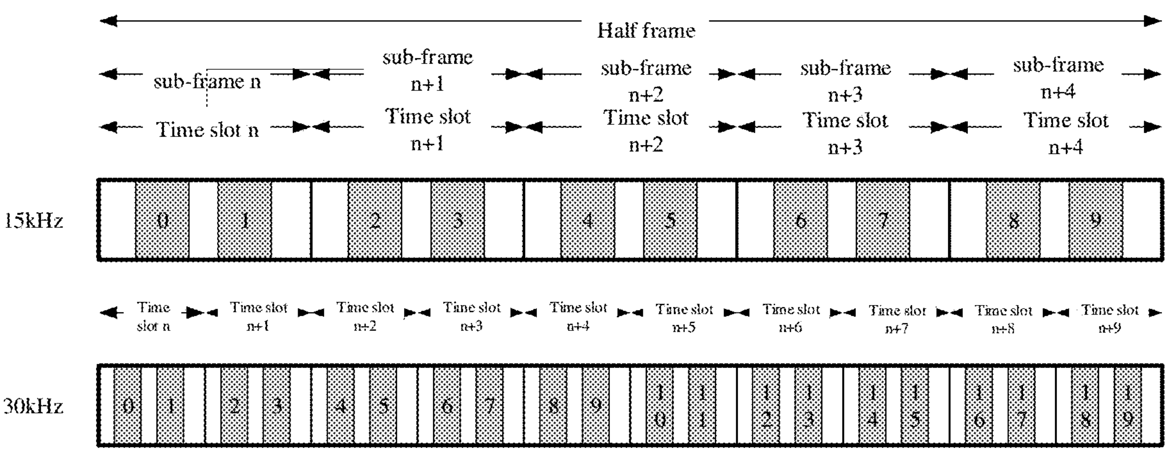
FIG. 1C is a schematic view of candidate SSB locations within a half frame in the art.

Two Candidate SSB locations may be included in one time slot. The index of the SSB transmitted at the candidate location may be considered as a SSB candidate index. The maximum number of Candidate SSB locations that can be included in the half frame (5 ms) is related to the subcarrier spacing. When the subcarrier spacing of the SSB is 15 kHz, the maximum number of Candidate SSB locations may be 10, and candidate indexes of the SSBs transmitted at the Candidate SSB locations in the half frame are from 0 to 9 in the time domain, respectively. When the subcarrier spacing of the SSB is 30 kHz, the maximum number of Candidate SSB locations may be 20, and the candidate indexes of the SSBs transmitted at the Candidate SSB locations in the half frame are from 0 to 9 in the time domain, respectively. FIG. 1C shows a diagram of the Candidate SSB locations in a half frame. Alternatively, the half frame may be a first half frame (first 5 ms) or a last half frame (last 5 ms) of a wireless frame.

The terminal device may determine Candidate SSB locations having a same QCL assumption based on QCL assumption indication information Q. Alternatively, the terminal device may determine the SSB index based on the Q. The Q may be indicated by the network device or predetermined. The Q may be configured to indicate the maximum number of SSBs that can be transmitted by the network device within one discovery burst window. In other words, the Q may be configured to determine the SSB index. A value of the Q may be 1, 2, 4, or 8. The SSB index=(SSB candidate index mod Q), or, the SSB index=(the DMRS sequence of the PBCH index mod Q). For example, when the value of the Q is 4, the SSB candidate index of the SSB transmitted at the SSB candidate location 10 is 10, and therefore, the index of the SSB transmitted at the SSB candidate location 10 may be determined as (10 mod 4)=2.

The terminal device may determine the SSB that is actually transmitted based on the indication information from the network device, such as ssb-PositionsInBurst. The indication information corresponds to one bitmap. A first bit in the bitmap corresponds to a SSB index 0, a second bit in the bitmap corresponds to a SSB index 1, and so forth. For example, a bit of 0 may be configured to indicate that a SSB corresponding to the bit is not transmitted, and a bit of 1 may be configured to indicate that the SSB corresponding to the bit has been transmitted. Alternatively, the bitmap corresponding to the indication information, such as the ssb-PositionsInBurst, has a length of 8. Alternatively, the terminal device may assume that a bit position greater than the Q in the bitmap is 0. The terminal device may expect that the configuration information provided by the ssb-PositionsInBurst in the ServingCellConfigCommon is the same as the configuration information provided by the ssb-PositionsInBurst in the SIB1.

For example, when the bitmap corresponding to the ssb-PositionsInBurst on a service cell is [10100000] and the value of the Q is 4, the indexes of the SSBs transmitted on the service cell are SSB 0 and SSB 2. When the subcarrier spacing of SSB is 30 kHz and the length of the discovery burst window is 5 ms, as shown in FIG. 1A, the Candidate SSB locations that can be used for transmitting SSBs include Candidate SSB locations 0, 2, 4, 6, 8, 10, 12, 14, 16, and 18. In an example, when the network device has a successful LBT at the SSB candidate location 6, the Candidate SSB locations that are actually used by the network device actually for transmitting SSBs include the Candidate SSB locations 6 and 8. In other words, the Candidate SSB indexes transmitted by the network device are SSB6 and SSB8. In the discovery burst window, when channel occupancy obtained by the network device further includes Candidate SSB locations 10, 12, 14, 16, and 18, the SSB candidate location 10, 12, 14, 16, and 18 are not used for transmitting SSBs.

When the NR system is deployed in the high frequency, since the FRX band includes the non-shared spectrum and the shared spectrum, transmitting the SSB on the shared spectrum may require a plurality of candidate locations in order to allow the network device to transmit the SSB through at least one of the plurality of candidate locations after a successful LBT. Since 64 SSBs are included in the high frequency, or even more SSBs such as 128 SSBs may be introduced, how to define the QCL relationship of the SSBs in this scenario is an issue to be discussed.

Technical solutions of the embodiments of the present disclosure can be applied to various communication systems, such as a Global System of Mobile communication (GSM) system, a Code Division Multiple Access (CDMA) system, a Wideband Code Division Multiple Access (WCDMA) system, a General Packet Radio Service (GPRS), a Long Term Evolution (LTE) system, an Advanced long term evolution (LTE-A) system, a New Radio (NR) system, an evolutionary system of the NR system, a LTE-based access to unlicensed spectrum (LTE-U) system, a NR-based access to unlicensed spectrum (NR-U) system, a Non-Terrestrial Network (NTN) system, a Universal Mobile Telecommunication System (UMTS), a Wireless Local Area Networks (WLAN) system, Wireless Fidelity (WiFi), a 5th-Generation (5G) system, or other communication systems.

Generally, a conventional communication system supports a limited number of connections and may be achieved easily. However, as communication technology develops, a mobile communication system may support not only the conventional communication, but also, such as device-to-device (D2D) communication, machine-to-machine (M2M) communication, machine-type communication (MTC), Vehicle to Vehicle (V2V) communication, or Vehicle to everything (V2X) communication, and so on. Embodiments of the present disclosure can also be applied to the above communications.

In some embodiments, the communication system in the embodiments of the present disclosure may be applied to a Carrier Aggregation (CA) scenario, a Dual Connectivity (DC) scenario, or a Standalone (SA) deployment scenario.

In some embodiments, the communication system in the embodiments of the present disclosure may be applied to the unlicensed spectrum. The unlicensed spectrum may also be considered as the shared spectrum. Alternatively, the communication system in the embodiments of the present disclosure may also be applied to the licensed spectrum, and the licensed spectrum may also be considered as the non-shared spectrum.

Embodiments of the present disclosure describe various embodiments by referring to the network device and the terminal device. The terminal device may be referred to as a User Equipment (UE), an access terminal, a user unit, a user station, a mobile station, a mobile platform, a remote station, a remote terminal, a mobile device, a user terminal, a terminal, a wireless communication device, a user agent, or a user apparatus.

The terminal device may be a station in the WLAN, a cellular phone, a cordless phone, a session initiation protocol (SIP) phone, a Wireless Local Loop (WLL) station, a Personal Digital Assistant (PDA) device, a handheld device having wireless communication functions, a computing device or other processing devices connected to a wireless modem, an in-vehicle device, a wearable device, a terminal device in a next-generation communication system such as the NR network or in a future evolved Public Land Mobile Network (PLMN) network, and so on.

In the present disclosure, the terminal device may be deployed on land, including indoors or outdoors, handheld, wearable or vehicle-mounted; or deployed on water (such as on ships and so on); or deployed in the air (such as on an aircraft, a balloon, a satellite, and so on).

In the present disclosure, the terminal device may be a mobile phone, a tablet computer (a pad), a computer having wireless transceiver function, a virtual reality (VR) terminal device, an augmented reality (AR) terminal device, a wireless terminal device in industrial control, a wireless terminal device in self driving, a wireless terminal device in remote medical, a wireless terminal device in smart grid, a wireless terminal device in transportation safety, and a wireless terminal device in a smart city or a smart home, and so on.

As an example and not limitation, in the present disclosure, the terminal device may also be a wearable device. The wearable device may also be called a wearable smart device, which is a general term for a device that can be worn and is designed and developed by applying wearable technology, such as glasses, gloves, watches, clothes, shoes, and so on. The wearable device is a portable device that is worn directly on the body or integrated into the user's clothes or accessories. The wearable device is not only a hardware device, but also a powerful function that can be achieved through software support, data interaction and cloud interaction. Broadly speaking, the wearable smart device includes a full-featured and large-sized device that can achieve complete or partial functions without relying on smartphones, such as a smart watch or smart glasses; and a device (such as a smart bracelet and a smart jewelry for monitoring physical parameters) that only focuses on a certain type of application and needs to be used with other devices such as smartphones.

In embodiments of the present disclosure, the network device may be a device for communicating with the mobile device, the network device may be an access point (AP) in the WLAN, a base station (BTS) in the GSM or CDMA, a NodeB (NB) in the WCDMA, and an evolutional Node B (eNB or eNodeB) in the LTE, or a relay station or an access point, or an in-vehicle device, a wearable device, and a network device (gNB) in the NR network or a network device in the future evolved PLMN network or a network device in the NTN network, and so on.

As an example and not limitation, in embodiments of the present disclosure, the network device may be mobile. For example, the network device may be a mobile device. Alternatively, the network device may be a satellite, a balloon station. For example, the satellite may be a low earth orbit (LEO) satellite, a medium earth orbit (MEO) satellite, a geostationary earth orbit (GEO) satellite, a high elliptical orbit (HEO) satellite, and so on. Alternatively, the network device can also be a base station installed on land, on water, and so on.

In the present disclosure, the network device can provide service to the cell, and the terminal device communicates with the network device through transmission resources (such as through frequency domain resources or spectrum resources) used by the cell. The cell may be a cell corresponding to the network device (such as the base station). The cell may belong to a macro base station or a base station corresponding to a small cell. The small cell may include: a metro cell, a micro cell, a pico cell, a femto cell, and so on. These small cells have small coverage area and low transmit power, and therefore, these cells are suitable for providing high speed data transmission services.

Figure 2:
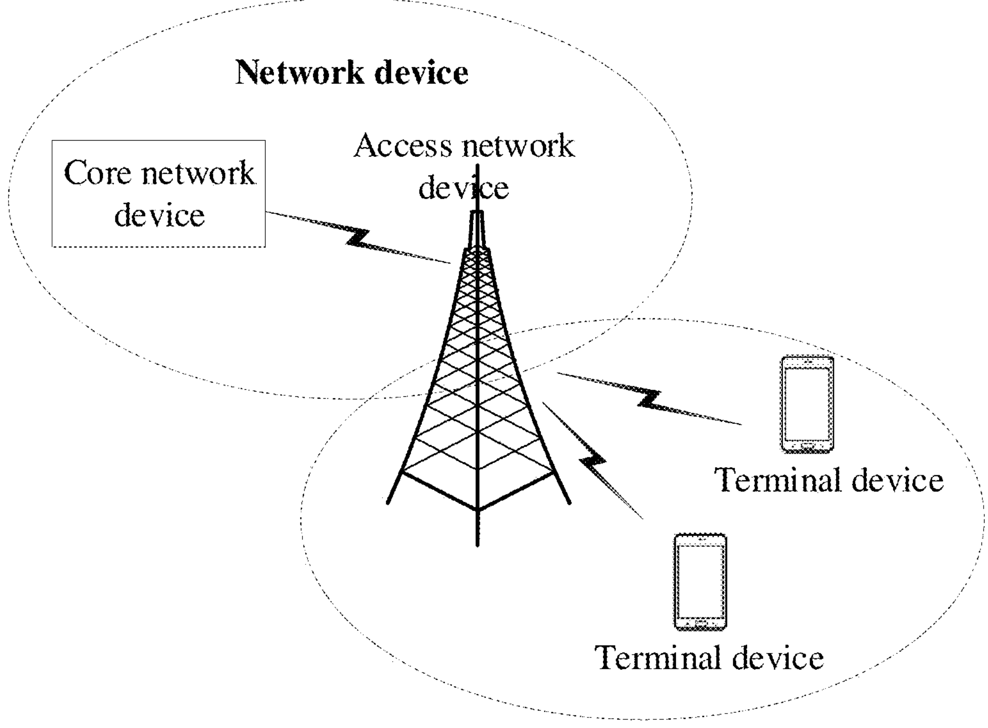
FIG. 2 is a system architecture diagram of a communication system according to an embodiment of the present disclosure.

FIG. 2 is a system architecture diagram of a communication system according to an embodiment of the present disclosure. The communication system may include a network device. The network device may be a device that communicates with a terminal device (or a communication terminal, a terminal). The network device may provide communication coverage for a specific geographic area and may communicate with any terminal device located within that coverage area. FIG. 2 illustrates exemplarily one network device and two terminal devices. In some embodiments, the communication system may include a plurality of network devices, and each network device may include other numbers of terminal devices within the coverage area of the respective network device, which will not be limited herein. In some embodiments, the communication system may further include other network entities such as a network controller, a mobile management entity, and so on, which will not be limited herein.

The network device may include an access network device and a core network device. That is, the wireless communication system further includes a plurality of core networks configured to communicate with the access network device. The access network device may be an evolutional node B (eNB or e-NodeB) macro base station, a micro base station (also known as a small base station), a micro base station, an access point (AP), a transmission point (TP) or a new generation Node B (gNodeB), and so on, in the long-term evolution (LTE) system, the next generation (mobile communication system) (next radio, NR) system or the authorized auxiliary access long-term evolution (LAA-LTE LTE) system.

It shall be understood that a device having communication functions in the network/system in the present disclosure may be referred to as a communication device. Taking the communication system illustrated in FIG. 2 as an example, the communication device may include a network device and a terminal device having communication functions. The network device and the terminal device may be specific devices described in the embodiments of the present disclosure, which will not be repeated herein. The communication device may further include other devices in the communication system, such as a network controller, a mobile management entity, and other network entities, which are not limited herein.

It shall be understood that the terms "system" and "network" are often used interchangeably herein. The term "and/or" herein is only a description of an association relationship between associated objects and indicates that three relationships can exist. For example, A and/or B may indicate: presence of A alone, presence of both A and B, and presence of B alone. In addition, the character "/" herein generally indicates an object before the character or an object after the character.

It shall be understood that "indication" in embodiments of the present disclosure may be a direct indication, an indirect indication, or an indication of an associative relationship. For example, A instructing B may mean that A instructs B directly, for example, B can obtain information through A; or mean that A instructs B indirectly, for example, A instructs C, and B obtain information through C; or mean that A and B are associated with each other.

It shall be understood that in the present disclosure, "predefined" may be achieved by storing in advance corresponding codes, tables or other means that can be used to indicate relevant information in the device (such as including the terminal device and the network device). The present disclosure does not limit specific implementation. For example, predefined information may be defined in a protocol.

It shall be understood that in present disclosure, the "protocol" may refer to a standard protocol in the field of communication. The protocol may include, for example, a LTE protocol, a NR protocol, and relevant protocols applied in future communication systems, which will not be limited herein.

It shall be understood that in the present disclosure, serial numbers of various processes do not imply an order of executing the processes. The order of executing the various processes shall be determined by functions and inherent logic of the processes, and should not constitute any limitation to the embodiments of the present disclosure.

Figure 3A:
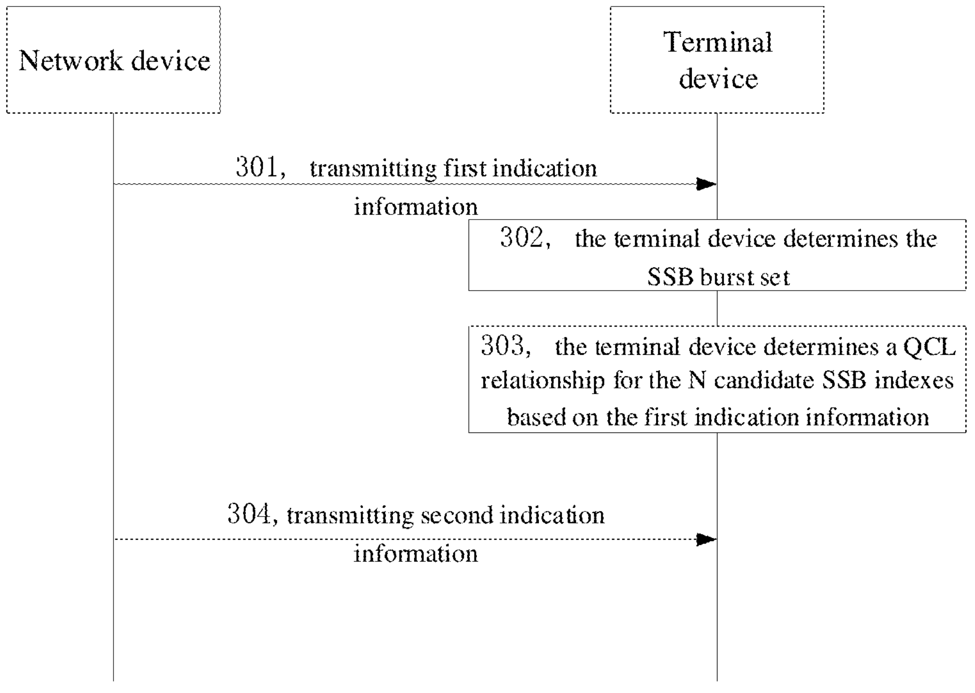
FIG. 3A is a flow chart of a method of transmitting synchronized signal blocks (SSBs) according to an embodiment of the present disclosure.

The technical solution of the present disclosure is further described below by illustrating embodiments, as shown in FIG. 3A, FIG. 3A is a flow chart of a method of transmitting synchronized signal blocks (SSBs) according to an embodiment of the present disclosure. The method includes the following operations.

In an operation 301, a network device transmits first indication information to a terminal device. The first indication information is configured to determine a quasi-colocation (QCL) relationship for N Candidate SSB indexes. The N Candidate SSB indexes correspond to N Candidate SSB locations included in a SSB burst set. The N is an integer greater than 20.

The terminal device receives the first indication information.

In some embodiments, the first indication information is transmitted by the network device via a system message MIB or SIB1 or PBCH. In some embodiments, the first indication information is transmitted by the network device via a high level configuration parameter. In some embodiments, the first indication information is predefined.

In some embodiments, the N is an integer greater than 20.

In some embodiments, a value of the N is 64 or 128. Exemplarily, the value of the N may be 64 or 128 or other values.

It shall be understood that each of the N Candidate SSB locations corresponds to one SSB candidate index, and therefore, when the value of the N is 64, the SSB burst set includes 64 Candidate SSB locations, and the 64 Candidate SSB locations correspond to 64 Candidate SSB indexes. When the value of N is 128, the SSB burst set includes 128 Candidate SSB locations, and the 128 Candidate SSB locations correspond to 128 Candidate SSB indexes.

In some embodiments, the SSB burst set corresponds to a subcarrier spacing of 120 kHz, the value of N is 128, and/or, a length of a transmission window corresponding to the SSB burst set is 10 ms. That is, for the 120 kHz subcarrier spacing, the number of candidate SSBs included in the SSB burst set may be extended to be 128, and/or, the length of the transmission window corresponding to the SSB burst set may be extended to be 10 ms.

In some embodiments, an information field in the PBCH is reused to indicate an additional SSB index. For example, a transmission starting location of the SSB burst set may be mixed to be a first half frame, and a half frame indication in the PBCH may be reused to indicate the additional SSB index.

In some embodiments, an available grouping method is reused to indicate the indexes of the SSBs.

In some embodiments, in response to the number of Candidate SSB indexes being greater than 64, the maximum number of SSB indexes is 64.

In an operation 302, the terminal device determines the SSB burst set. The SSB burst set includes N candidate SSB locations. Each candidate SSB location in the N candidate SSB locations corresponds to one candidate SSB index. The N is an integer greater than 20.

In some embodiments, the terminal device determines the SSB burst set by predefined means.

In an operation 303, the terminal device determines a QCL relationship for the N candidate SSB indexes based on the first indication information.

In some embodiments, the QCL relationship includes: a first SSB index corresponding to M first candidate SSB indexes in the N candidate SSB indexes. The M first candidate SSB indexes have a same QCL relationship. The M is an integer greater than or equal to 1 and less than or equal to N. It is understood that the first SSB index herein is any one SSB index.

It is understood that the M first candidate SSB indexes having the same QCL relationship may mean that SSBs indicated by the M first candidate SSB indexes have a same QCL relationship, or mean that SSB locations corresponding to the M first candidate SSB indexes have a same QCL relationship.

(1) The first indication information indicates a Q value. The operation of the terminal device determining the QCL relationship of the N candidate SSB indexes based on the first indication information includes the following operations.

The terminal device determines the QCL relationship of the N candidate SSB indexes according to a first formula, or, the terminal device determines that the M first candidate SSB indexes have the same QCL relationship according to the first formula.

The first formula includes: the first SSB index=mod (the first candidate SSB index, the first indication information). The mod ( ) denotes a modulo operation, and the first SSB index includes 0, 1, . . . , Q−1. The first candidate SSB index is any one of the M first candidate SSB indexes corresponding to the first SSB index.

In some embodiments, the Q value may be 8, 16, 32 or 64.

In some embodiments, the first indication information indicates the Q value. When the Q value is less than or equal to 8, and the Q is a positive integer. The operation of the terminal device determining the QCL relationship of the N candidate SSB indexes according to the first indication information, includes the following operations.

The terminal device determines the QCL relationship of the N candidate SSB indexes according to a second formula, or, the terminal device determines that the M first candidate SSB indexes have the same QCL relationship according to the second formula.

The second formula includes: the first SSB index=mod (DMRS sequence index of the PBCH corresponding to the first candidate SSB index, the first indication information). The mod ( ) denotes a modulo operation.

Exemplarily, when the Q value is 8, the first SSB index may be determined based on the DMRS sequence index of the PBCH.

It shall be understood that, similar to the NR-U system, in the HF system, the QCL first indication information Q may be introduced to determine candidate SSB locations having a same QCL. The Q may be configured to indicate the maximum number of SSBs that can be transmitted, or the terminal device may determine the SSB index based on the Q.

(2) In some embodiments, the first indication information indicates an M value. The operation of the terminal device determining the QCL relationship of the N candidate SSB indexes based on the first indication information, includes the following operations.

The terminal device determines the QCL relationship of the candidate SSB indexes according to a third formula, or, the terminal device determines that the M first candidate SSB indexes have the same QCL relationship according to the third formula.

The third formula includes: the first SSB index=the first candidate SSB index+r. The first SSB index includes (kM).

The r=0, 1, . . . , M−1; the k=0, 1, . . . , ceil(N/M)−1, and the ceil( ) denotes upper rounding.

Exemplarily, when the N value is 64, a transmittable SSB index included in the SSB burst set is SSB (kM). The k takes values of 0, 1, . . . , 64/M−1. The M is the number of candidate SSB indexes (or locations) corresponding to one SSB index. In some embodiments, one SSB index corresponds to M consecutive candidate SSB indexes. 64/M is the maximum number of SSB indexes that can be transmitted.

In some embodiments, the value of M may be 1, 2, 4, 8.

In some embodiments, the first SSB index corresponds to M consecutive first candidate SSB indexes of the N candidate SSB indexes.

In some embodiments, the first indication information indicates the value of M.

When the value of M is 8, the number of transmittable first SSB indexes in the SSB burst set is less than or equal to 8.

When the value of M is 4, the number of transmittable first SSB indexes in the SSB burst set is greater than 8 and less than or equal to 16.

When the value of M is 2, the number of transmittable first SSB indexes in the SSB burst set is greater than 16 and less than or equal to 32.

When the value of M is 1, the number of transmittable first SSB indexes in the SSB burst set is greater than 32 and less than or equal to 64.

In some embodiments, the first indication information indicates the value of M.

When the value of M is 4, the number of transmittable first SSB indexes in the SSB burst set is divisible by 2.

When the value of M is 2, the number of transmittable first SSB indexes in the SSB burst set is divisible by 4.

When the value of M is 1, the number of transmittable first SSB indexes in the SSB burst set is divisible by 8.

Exemplarily, when M=8, the number of SSB beams transmitted by the network device is less than or equal to 8. When M=4, the number of SSB beams transmitted by the network device is greater than 8 and less than or equal to 16. When M=4, the number of SSBs that can be transmitted by the network device is divisible by (8/M=2), such as one of 2, 4, 6, 8, 10, 12, 14, and 16. When M=2, the number of SSB beams transmitted by the network device is greater than 16 and less than or equal to 32. When M=2, the number of SSBs that can be transmitted by the network device is divisible by (8/M=4), such as one of 4, 8, 12, 16, 20, 24, 28, and 32. When M=1, the number of SSB beams transmitted by the network device is greater than 32 and less than or equal to 64.

Figures 3B, 3C:
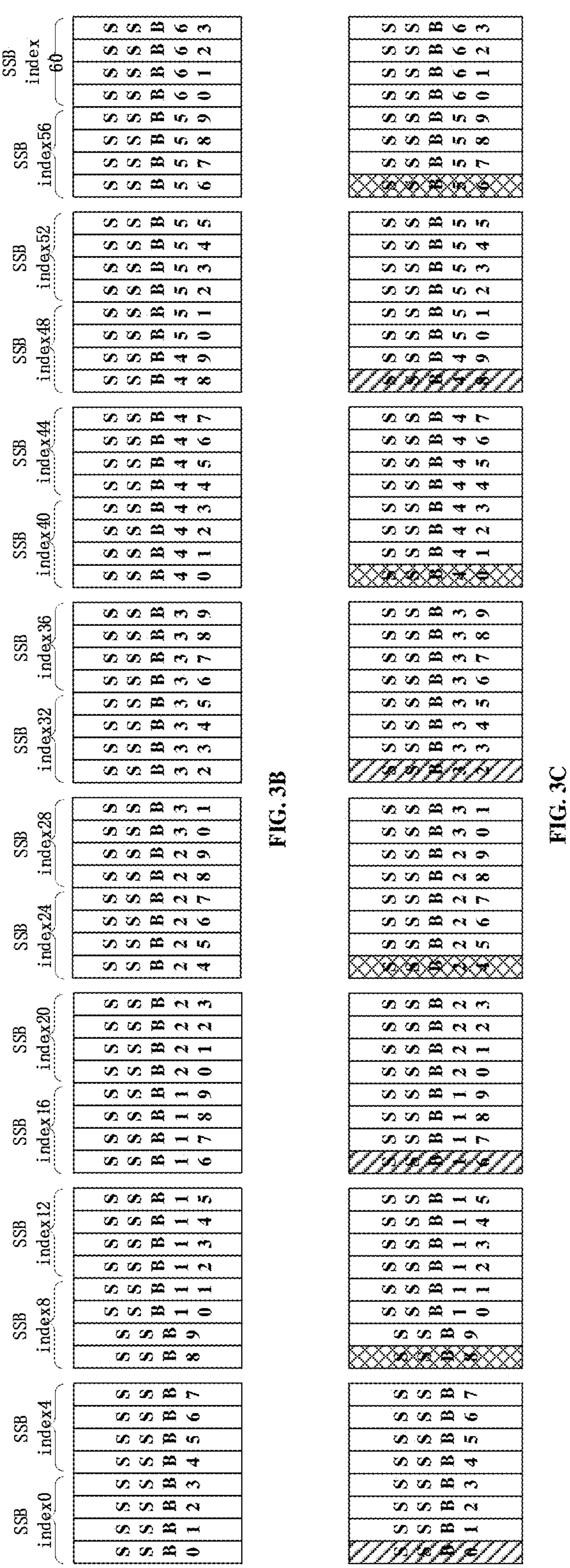
FIG. 3B is a schematic diagram of a QCL relationship of candidate SSBs according to an embodiment of the present disclosure.
FIG. 3C is a schematic diagram of a QCL relationship between a SSB0 and a SSB8 according to an embodiment of the present disclosure.

For example, when the M is 4, the QCL relationship of candidate SSBs is shown in FIG. 3B. In FIG. 3B, SSB0, SSB1, SSB2, and SSB3 correspond to a same SSB index 0; SSB4, SSB5, SSB6, and SSB7 correspond to a same SSB index 4; SSB8, SSB9, SSB10, SSB11 correspond to a same SSB index 8, . . . ; SSB56, SSB57, SSB58, SSB59 correspond to a same SSB index 56; SSB60, SSB61, SSB62, and SSB63 correspond to a same SSB index 60. That is, the transmittable first SSB indexes included in the SSB burst set are: SSB index 0, SSB index 4, SSB index 8, SSB index 12, SSB index 16, SSB index 20, SSB index 24, SSB index 28, SSB index 32, SSB index 36, SSB index 40, SSB index 44, SSB index 48, SSB index 52, SSB index 56, and SSB index 60.

In some embodiments, when the value of M is 1, the SSB burst set does not include (i.e., excludes) candidate SSB indexes having the same QCL relationship. That is, when M=1, the SSB burst set does not include two SSBs having the same QCL relationship.

It shall be understood that the M is configured to determine the QCL relationship of SSBs in one group, or the M is configured to indicate the number of candidate SSB locations corresponding to one SSB index in one group. Different groups follow a same QCL standard.

In an operation 304, the network device transmits second indication information to the terminal device. The second indication information is configured to indicate a SSB index that is transmitted and is included in the SSB burst set. The second indication information includes N bits, or, the second indication information includes (L+C) bits. The L*C=N, and each of the L and the C is a positive integer.

The terminal device receives the second indication information. The second indication information is configured to indicate the SSB index that is transmitted and is included in the SSB burst set. The second indication information includes N bits, or, the second indication information includes (L+C) bits. The L*C=N, and each of the L and the C is a positive integer.

In some embodiments, the second indication information includes N bits, the N bits and the N candidate SSB indexes are in one-to-one correspondence.

Alternatively, the second indication information includes (L+C) bits. The N candidate SSB indexes are grouped into L groups. Each of the L groups includes C candidate SSB indexes. The L bits and the L groups are in one-to-one correspondence, and the C bits and the C candidate SSB indexes in each group are in one-to-one correspondence.

In some embodiments, the first indication information indicates the Q value, the Q is an integer greater than or equal to 1 and less than or equal to N.

When the second indication information includes the N bits, first Q bits of the N bits are valid bits.

Alternatively, when the second indication information includes the (L+C) bits, valid bits of the (L+C) bits are determined according to at least one of the following.

When the Q is less than or equal to C, the first Q bits of the C bits are the valid bits.

When the Q is greater than C, the C bits are the valid bits, and first ceil(Q/C) bits of the L bits are the valid bits. The ceil(denotes a rounding up operation.

Exemplarily, the network device takes same candidate SSB locations in different groups to transmit the SSBs. In some embodiments, the first (Q/8) bits in a group bitmap, such as the groupPresence, are valid bits. For example, when Q=8, a first one bit in the group bitmap is a valid bit; when Q=16, first two bits in the group bitmap are the valid bits; when Q=32, first four bits in the group bitmap are the valid bits; when Q=64, all eight bits in the group bitmap are the valid bits.

In some embodiments, the first indication information indicates the Q value, the Q is an integer greater than or equal to 1 and less than or equal to N. The second indication information includes (L+C) bits. When the Q is less than or equal to (L+C), the first Q bits of the (L+C) bits are the valid bits, and the C bits of the (L+C) bits are located before the L bits, or the L bits of the (L+C) bits are located before the C bits.

In some embodiments, the first indication information indicates the Q value, and the Q is an integer greater than or equal to 1 and less than or equal to N.

When the value of Q is 8, the number of transmittable first SSB indexes in the SSB burst set is less than or equal to 8.

When the value of Q is 16, the number of transmittable first SSB indexes in the SSB burst set is greater than 8 and less than or equal to 16.

When the value of Q is 32, the number of transmittable first SSB indexes in the SSB burst set is greater than 16 and less than or equal to 32.

When the value of Q is 64, the number of transmittable first SSB indexes in the SSB burst set is greater than 32 and less than or equal to 64.

In some embodiments, the first indication information indicates the Q value, and the Q is an integer greater than or equal to 1 and less than or equal to N.

When the value of Q is 16, the number of transmittable first SSB indexes in the SSB burst set is divisible by 2.

When the value of Q is 32, the number of transmittable first SSB indexes in the SSB burst set is divisible by 4.

When the value of Q is 64, the number of transmittable first SSB indexes in the SSB burst set is divisible by 8.

Exemplarily, when Q=8, the number of SSB beams transmitted by the network device is less than or equal to 8. When Q=16, the number of SSB beams transmitted by the network device is greater than 8 and less than or equal to 16. In some embodiments, in this case, the number of SSBs that can be transmitted by the network device is divisible by 2, such as one of 10, 12, 14, 16. When Q=32, the number of SSB beams transmitted by the network device is greater than 16 and less than or equal to 32. In some embodiments, in this case, the number of SSBs that can be transmitted by the network device is divisible by 4, such as one of 20, 24, 28, and 32. When Q=64, the number of SSB beams transmitted by the network device is greater than 32 and less than or equal to 64.

For example, when the Q is 16, the QCL relationship between SSB0 and SSB8 is shown in FIG. 3C. In FIG. 3C, candidate SSB indexes corresponding to SSB0 include SSB0, SSB16, SSB32, and SSB48, that is, SSB0 may be transmitted through candidate SSB locations corresponding to SSB0, SSB16, SSB32, and SSB48. Candidate SSB indexes corresponding to SSB8 include SSB8, SSB24, SSB40, and SSB56, and that is, SSB8 can be transmitted through candidate SSB locations corresponding to SSB8, SSB24, SSB40, and SSB56. Other SSB indexes may be obtained similarly. In this case, the first SSB indexes that can be transmitted and are included in the SSB burst set are SSB0 to SSB15.

In some embodiments, when the value of Q is 64, the SSB burst set does not include candidate SSB indexes having the same QCL relationship. That is, when Q=64, the SSB burst set does not include two SSBs having the same QCL relationship.

In some embodiments, the second indication information is transmitted by the network device via the system message SIB1, or, the second indication information is transmitted by the network device via a high level configuration parameter.

However, when the network device takes the SIB1 to indicate the transmitted SSB index, the 64 candidate SSB locations are grouped into 8 groups. Each of the 8 groups includes 8 SSBs, and a total of 16 bits are used to indicate the transmitted SSB index. Therefore, for the SSB transmission indication method in the art, the SSB index transmitted by a random combination in the SSB burst set cannot be indicated directly. For example, when the network device wishes to transmit SSB0 and SSB10, the transmitted SSB index cannot be indicated by the above method.

In some embodiments, when the network device takes the SIB1 to indicate the transmitted SSB index, for example, the network device takes the ssb-PositionsInBurst in the SIB1 to provide corresponding configuration information, a complete bitmap, i.e., 64 bits, may be used to indicate the transmitted SSB index.

In some embodiments, when the network device determines the transmittable SSB index, an indication rule of an available SSB transmission indication method must be met.

To be noted that, in the embodiments of the present disclosure, a timing order of performing the operations 301 to 304 is not limited herein.

Figure 4:
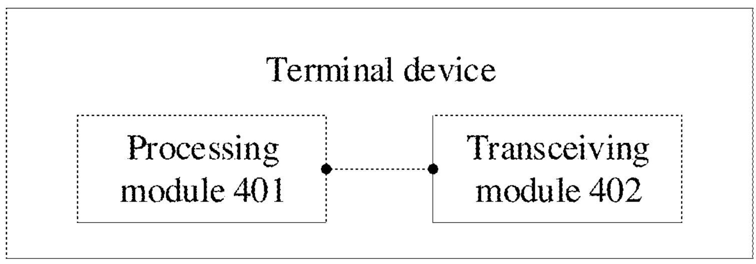
FIG. 4 is a schematic view of a terminal device according to an embodiment of the present disclosure.

According to the present disclosure, the terminal device determines the SSB burst set. The SSB burst set includes N candidate SSB locations. Each of the N candidate SSB locations corresponds to one candidate SSB index. The N is an integer greater than 20. The terminal device determines the QCL relationship of the N candidate SSB indexes based on the first indication information. That is, since 64 SSBs are included in the high frequency, or even a larger number of SSBs such as 128 SSBs may be introduced, the QCL relationship of the SSBs may be defined more accurately in this scenario. After the QCL relationship indication are introduced in the high frequency, in the SSB burst set in the high frequency, SSBs or SSB indexes corresponding to one beam may be transmitted through at least one of the plurality of candidate SSB locations. In this way, more SSB transmission opportunities are available in the network, performance of an initial access of the terminal device and performance of measurement of the terminal device may be improved Corresponding to the method of at least one of the above embodiments applied to the terminal device, the present disclosure further provides one or more terminal devices. The terminal device of the embodiments of the present disclosure may implement any of the above methods. As shown in FIG. 4, FIG. 4 is a schematic view of a terminal device according to an embodiment of the present disclosure. The terminal device may include the following components.

A processing module 401 is configured to determine an SSB burst set, the SSB burst set includes N candidate SSB locations. Each of the N candidate SSB locations corresponds to one candidate SSB index. The N is an integer greater than 20. The processing module 401 is further configured to determine the QCL relationship of the N candidate SSB indexes based on the first indication information.

In some embodiments, the QCL relationship includes the following.

The first SSB index corresponds to M first candidate SSB indexes in the N candidate SSB indexes. The M first candidate SSB indexes have the same QCL relationship. The M is an integer greater than or equal to 1 and less than or equal to N.

In some embodiments, the first indication information indicates the Q value.

The processing module 401 is configured to determine the QCL relationship of the N candidate SSB indexes according to the first formula, or to determine that the M first candidate SSB indexes have the same QCL relationship according to the first formula.

The first formula includes: the first SSB index=mod (the first candidate SSB index, the first indication information). The mod ( ) denotes the modulo operation, and the first SSB index includes 0, 1, . . . , Q−1.

In some embodiments, the first indication information indicates the Q value. When the Q value is less than or equal to 8, and the Q is a positive integer.

The processing module 401 is configured to determine the QCL relationship of the N candidate SSB indexes according to the second formula, or to determine that the M first candidate SSB indexes have the same QCL relationship according to the second formula.

The second formula includes: the first SSB index=mod (DMRS sequence index of the PBCH corresponding to the first candidate SSB index, the first indication information). The mod ( ) denotes the modulo operation.

In some embodiments, the terminal device further includes the following.

A transceiving module 402 is configured to transceive the second indication information. The second indication information is configured to indicate the SSB index that is transmitted and is included in the SSB burst set. The second indication information includes N bits, or, the second indication information includes (L+C) bits. The L*C=N, and each of the L and the C is a positive integer.

In some embodiments, the second indication information includes N bits, the N bits and the N candidate SSB indexes are in one-to-one correspondence.

Alternatively, the second indication information includes (L+C) bits. The N candidate SSB indexes are grouped into L groups. Each of the L groups includes C candidate SSB indexes. The L bits and the L groups are in one-to-one correspondence, and the C bits and the C candidate SSB indexes in each group are in one-to-one correspondence.

In some embodiments, the first indication information indicates the Q value, the Q is an integer greater than or equal to 1 and less than or equal to N.

When the second indication information includes the N bits, first Q bits of the N bits are valid bits.

Alternatively, when the second indication information includes the (L+C) bits, valid bits of the (L+C) bits are determined according to at least one of the following.

When the Q is less than or equal to C, the first Q bits of the C bits are the valid bits.

When the Q is greater than C, the C bits are the valid bits, and first ceil(Q/C) bits of the L bits are the valid bits. The ceil(denotes a rounding up operation.

In some embodiments, the first indication information indicates the Q value, the Q is an integer greater than or equal to 1 and less than or equal to N. The second indication information includes (L+C) bits. When the Q is less than or equal to (L+C), the first Q bits of the (L+C) bits are the valid bits, and the C bits of the (L+C) bits are located before the L bits, or the L bits of the (L+C) bits are located before the C bits.

In some embodiments, the first indication information indicates the Q value, and the Q is an integer greater than or equal to 1 and less than or equal to N.

When the value of Q is 8, the number of transmittable first SSB indexes in the SSB burst set is less than or equal to 8.

When the value of Q is 16, the number of transmittable first SSB indexes in the SSB burst set is greater than 8 and less than or equal to 16.

When the value of Q is 32, the number of transmittable first SSB indexes in the SSB burst set is greater than 16 and less than or equal to 32.

When the value of Q is 64, the number of transmittable first SSB indexes in the SSB burst set is greater than 32 and less than or equal to 64.

In some embodiments, the first indication information indicates the Q value, and the Q is an integer greater than or equal to 1 and less than or equal to N.

When the value of Q is 16, the number of transmittable first SSB indexes in the SSB burst set is divisible by 2.

When the value of Q is 32, the number of transmittable first SSB indexes in the SSB burst set is divisible by 4.

When the value of Q is 64, the number of transmittable first SSB indexes in the SSB burst set is divisible by 8.

In some embodiments, when the value of Q is 64, the SSB burst set does not include candidate SSB indexes having the same QCL relationship.

In some embodiments, the first indication information indicates the M value.

The processing module 401 is configured to determine the QCL relationship of the N candidate SSB indexes according to the third formula, or to determine that the M first candidate SSB indexes have the same QCL relationship according to the third formula.

The third formula includes: the first SSB index=the first candidate SSB index+r. The first SSB index includes (kM).

The r=0, 1, . . . , M−1; the k=0, 1, . . . , ceil(N/M)−1, and the ceil( ) denotes upper rounding.

In some embodiments, the first SSB index corresponds to M consecutive first candidate SSB indexes of the N candidate SSB indexes.

In some embodiments, the first indication information indicates the value of M.

When the value of M is 8, the number of transmittable first SSB indexes in the SSB burst set is less than or equal to 8.

When the value of M is 4, the number of transmittable first SSB indexes in the SSB burst set is greater than 8 and less than or equal to 16.

When the value of M is 2, the number of transmittable first SSB indexes in the SSB burst set is greater than 16 and less than or equal to 32.

When the value of M is 1, the number of transmittable first SSB indexes in the SSB burst set is greater than 32 and less than or equal to 64.

In some embodiments, the first indication information indicates the value of M.

When the value of M is 4, the number of transmittable first SSB indexes in the SSB burst set is divisible by 2.

When the value of M is 2, the number of transmittable first SSB indexes in the SSB burst set is divisible by 4.

When the value of M is 1, the number of transmittable first SSB indexes in the SSB burst set is divisible by 8.

In some embodiments, when the value of M is 1, the SSB burst set does not include candidate SSB indexes having the same QCL relationship.

In some embodiments, the second indication information is transmitted by the network device via the system message SIB1 or via a high level configuration parameter.

In some embodiments, the first indication information is transmitted by the network device via the system message MIB or SIB1 or PBCH. In some embodiments, the first indication information is transmitted by the network device via the high level configuration parameter. In some embodiments, the first indication information is predefined.

In some embodiments, the N is 64 or 128.

In some embodiments, the SSB burst set corresponds to a subcarrier spacing of 120 kHz, the value of N is 128, and/or, a length of a transmission window corresponding to the SSB burst set is 10 ms.

Figure 5:
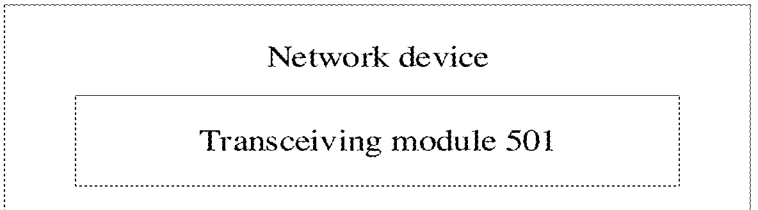
FIG. 5 is a schematic view of a network device according to an embodiment of the present disclosure.

Corresponding to the method of at least one of the above embodiments applied to the network device, the present disclosure further provides one or more network devices. The network device of the embodiments of the present disclosure may implement any of the above methods. As shown in FIG. 5, FIG. 5 is a schematic view of a network device according to an embodiment of the present disclosure. The network device may include following components.

A transceiving module 501 is configured to transmit first indication information to the terminal device. The first indication information is configured to determine the QCL relationship of the N candidate SSB indexes. The N candidate SSB indexes correspond to N candidate SSB locations included in a SSB burst set. The N is an integer greater than 20.

In some embodiments, the QCL relationship includes the following.

The first SSB index corresponds to M first candidate SSB indexes in the N candidate SSB indexes. The M first candidate SSB indexes have the same QCL relationship. The M is an integer greater than or equal to 1 and less than or equal to N.

In some embodiments, the first indication information indicates the Q value. The first indication information is configured to determine the QCL relationship of the N candidate SSB indexes according to the first formula, or to determine that the M first candidate SSB indexes have the same QCL relationship according to the first formula.

The first formula includes: the first SSB index=mod (the first candidate SSB index, the first indication information). The mod ( ) denotes the modulo operation, and the first SSB index includes 0, 1, . . . , Q−1.

In some embodiments, the first indication information indicates the Q value. When the Q value is less than or equal to 8, and the Q is a positive integer. The first indication information is configured to determine the QCL relationship of the N candidate SSB indexes according to the second formula, or to determine that the M first candidate SSB indexes have the same QCL relationship according to the second formula.

The second formula includes: the first SSB index=mod (DMRS sequence index of the PBCH corresponding to the first candidate SSB index, the first indication information). The mod ( ) denotes the modulo operation.

In some embodiments, the transceiving module 501 is further configured to transmit the second indication information to the terminal device. The second indication information is configured to indicate the SSB index that is transmitted and is included in the SSB burst set. The second indication information includes N bits, or, the second indication information includes (L+C) bits. The L*C=N, and each of the L and the C is a positive integer.

In some embodiments, the second indication information includes N bits, the N bits and the N candidate SSB indexes are in one-to-one correspondence.

Alternatively, the second indication information includes (L+C) bits. The N candidate SSB indexes are grouped into L groups. Each of the L groups includes C candidate SSB indexes. The L bits and the L groups are in one-to-one correspondence, and the C bits and the C candidate SSB indexes in each group are in one-to-one correspondence.

In some embodiments, the first indication information indicates the Q value, the Q is an integer greater than or equal to 1 and less than or equal to N.

When the second indication information includes the N bits, first Q bits of the N bits are valid bits.

Alternatively, when the second indication information includes the (L+C) bits, valid bits of the (L+C) bits are determined according to at least one of the following.

When the Q is less than or equal to C, the first Q bits of the C bits are the valid bits.

When the Q is greater than C, the C bits are the valid bits, and first ceil(Q/C) bits of the L bits are the valid bits. The ceil(denotes a rounding up operation.

In some embodiments, the first indication information indicates the Q value, the Q is an integer greater than or equal to 1 and less than or equal to N. The second indication information includes (L+C) bits. When the Q is less than or equal to (L+C), the first Q bits of the (L+C) bits are the valid bits, and the C bits of the (L+C) bits are located before the L bits, or the L bits of the (L+C) bits are located before the C bits.

In some embodiments, the first indication information indicates the Q value, and the Q is an integer greater than or equal to 1 and less than or equal to N.

When the value of Q is 8, the number of transmittable first SSB indexes in the SSB burst set is less than or equal to 8.

When the value of Q is 16, the number of transmittable first SSB indexes in the SSB burst set is greater than 8 and less than or equal to 16.

When the value of Q is 32, the number of transmittable first SSB indexes in the SSB burst set is greater than 16 and less than or equal to 32.

When the value of Q is 64, the number of transmittable first SSB indexes in the SSB burst set is greater than 32 and less than or equal to 64.

In some embodiments, the first indication information indicates the Q value, and the Q is an integer greater than or equal to 1 and less than or equal to N.

When the value of Q is 16, the number of transmittable first SSB indexes in the SSB burst set is divisible by 2.

When the value of Q is 32, the number of transmittable first SSB indexes in the SSB burst set is divisible by 4.

When the value of Q is 64, the number of transmittable first SSB indexes in the SSB burst set is divisible by 8.

In some embodiments, when the value of Q is 64, the SSB burst set does not include candidate SSB indexes having the same QCL relationship.

In some embodiments, the first indication information indicates the M value. The first indication information is configured to determine the QCL relationship of the N candidate SSB indexes according to the third formula, or to determine that the M first candidate SSB indexes have the same QCL relationship according to the third formula.

The third formula includes: the first SSB index=the first candidate SSB index+r. The first SSB index includes (kM).

The r=0, 1, . . . , M−1; the k=0, 1, . . . , ceil(N/M)−1, and the ceil( ) denotes upper rounding.

In some embodiments, the first SSB index corresponds to M consecutive first candidate SSB indexes of the N candidate SSB indexes.

In some embodiments, the first indication information indicates the value of M.

When the value of M is 8, the number of transmittable first SSB indexes in the SSB burst set is less than or equal to 8.

When the value of M is 4, the number of transmittable first SSB indexes in the SSB burst set is greater than 8 and less than or equal to 16.

When the value of M is 2, the number of transmittable first SSB indexes in the SSB burst set is greater than 16 and less than or equal to 32.

When the value of M is 1, the number of transmittable first SSB indexes in the SSB burst set is greater than 32 and less than or equal to 64.

In some embodiments, the first indication information indicates the value of M.

When the value of M is 4, the number of transmittable first SSB indexes in the SSB burst set is divisible by 2.

When the value of M is 2, the number of transmittable first SSB indexes in the SSB burst set is divisible by 4.

When the value of M is 1, the number of transmittable first SSB indexes in the SSB burst set is divisible by 8.

In some embodiments, when the value of M is 1, the SSB burst set does not include candidate SSB indexes having the same QCL relationship.

In some embodiments, the second indication information is transmitted by the network device via the system message SIB1 or via a high level configuration parameter.

In some embodiments, the first indication information is transmitted by the network device via the system message MIB or SIB1 or PBCH. In some embodiments, the first indication information is transmitted by the network device via the high level configuration parameter. In some embodiments, the first indication information is predefined.

In some embodiments, the N is 64 or 128.

In some embodiments, the SSB burst set corresponds to a subcarrier spacing of 120 kHz, the value of N is 128, and/or, a length of a transmission window corresponding to the SSB burst set is 10 ms.

Figure 6:
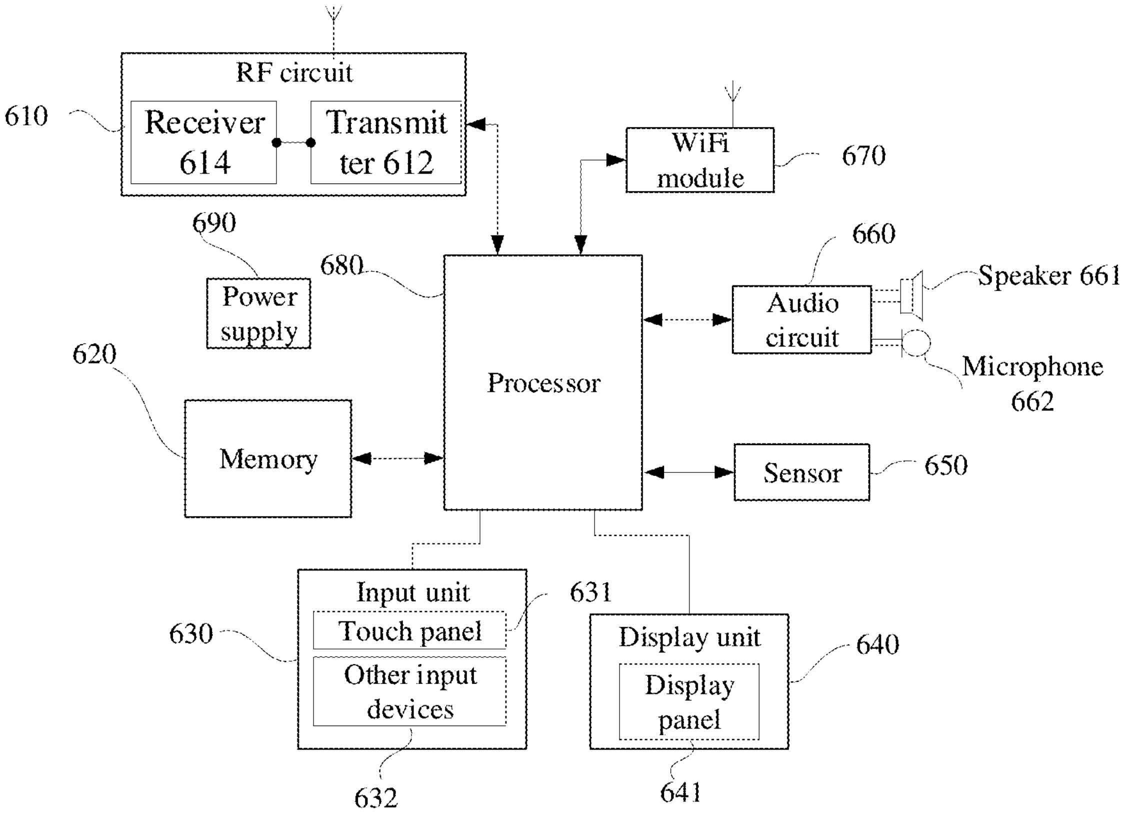
FIG. 6 is a schematic view of a terminal device according to another embodiment of the present disclosure.

Corresponding to the method of at least one of the above embodiments applied to the terminal device, the present disclosure further provides one or more terminal devices. The terminal device of the embodiments of the present disclosure may implement any of the above methods. As shown in FIG. 6, FIG. 6 is a schematic view of a terminal device according to another embodiment of the present disclosure. The terminal device is illustrated by taking a mobile phone as an example. The terminal device may include: a radio frequency (RF) circuit 610, a memory 620, an input unit 630, a display unit 640, a sensor 650, an audio circuit 660, a wireless fidelity (WiFi) module 670, a processor 680, and a power supply 690 and so on. The RF circuit 610 may include a receiver 614 and a transmitter 612. It will be understood by any ordinary skilled person in the art that the structure of the mobile phone illustrated in FIG. 6 does not constitute a limitation of the mobile phone. The mobile phone may include more or fewer components than illustrated or include a combination of certain components, or components may be arranged in a way different from the illustration.

Each component of the mobile phone will be described in detail below by referring to FIG. 6.

The RF circuit 610 may be configured to receive and transmit signals while transmitting and receiving messages or calls. In particular, the mobile terminal receives downlink information from the base station and transfers the information to the processor 680 for processing. In addition, the mobile phone transmits uplink data to the base station. Typically, the RF circuit 610 includes, but is not limited to, an antenna, at least one amplifier, a transceiver, a coupler, a low noise amplifier (LNA), a duplexer, and so on. In addition, the RF circuit 610 may communicate with networks and other devices via wireless communication. The above wireless communication may apply any communication standard or protocol, including but not limited to global system of mobile communication (GSM), a general packet radio service (GPRS), code division multiple access (CDMA), broadband division multiple access (CDMA), wideband code division multiple access (WCDMA), long term evolution (LTE), an e-mail, a short messaging service, and so on.

The memory 620 may be configured to store software programs and modules. The processor 680 performs various functional applications of the mobile phone and processes data by running the software programs and the modules stored in the memory 620. The memory 620 may primarily comprise a program storage area and a data storage area. The program storage area may store an operating system, at least one application required for functioning (such as sound playback function, image playback function, and so on), and so on. The data storage area may store data (such as audio data, contact list, and so on) created while the mobile phone is being used. In addition, the memory 620 may include high-speed random access memory, and may further include non-volatile memory, such as at least one disk memory device, flash memory device, or other volatile solid state memory devices.

The input unit 630 may be configured to receive inputting numeric or character information, and to generate key signal input relating to user settings and functional controlling of the phone. Specifically, the input unit 630 may include a touch panel 631 and other input devices 632. The touch panel 631, also known as a touch screen, may collect touch operations performed on or near the panel (such as operations performed by any suitable object or attachment such as a finger, a stylus, and so on, on or near the touch panel 631) and drive a corresponding connected device based on a predefined program. In some embodiments, the touch panel 631 may include two parts: a touch detection device and a touch controller. The touch detection device detects an orientation of a touch operation performed by the user and detects a signal generated by the touch operation. The touch detection device may then send the signal to the touch controller. The touch controller receives touch information from the touch detection device and converts the touch information into contact coordinates. Further, the touch controller transmits the coordinates to the processor 680 and may receive commands sent from the processor 680 and execute the commands. In addition, the touch panel 631 may be configured in a variety of types, such as a resistive touch panel, a capacitive touch panel, an infrared touch panel, and a surface acoustic wave touch panel. In addition to the touch panel 631, the input unit 630 may further include other input devices 632. Specifically, the other input devices 632 may include, but are not limited to, one or more of a physical keyboard, function buttons (such as volume control buttons, switch buttons, and so on), a trackball, a mouse, an operating stick, and so on.

The display unit 640 may be configured to display information entered by or provided to the user and various menus. The display unit 640 may include a display panel 641. In some embodiments, the display panel 641 may be configured in a form of a liquid crystal display (LCD), an organic light-emitting diode (OLED), and so on. Further, the touch panel 631 may cover the display panel 641. When the touch panel 631 detects a touch operation performed on or near the touch panel, the touch panel 631 transmits the operation to the processor 680 to determine a type of a touch event. The processor 680 subsequently provides a corresponding visual output on the display panel 641 based on the type of the touch event. Although in FIG. 6, the touch panel 631 and the display panel 641 are configured as two separated components to perform inputting and inputting functions of the mobile phone, in some embodiments, the inputting and outputting functions of the mobile phone may be achieved by integrating the touch panel 631 with the display panel 641.

The mobile phone may further include at least one sensor 650, such as a light sensor, a motion sensor, and other sensors. Specifically, the light sensor may include an ambient light sensor and a proximity sensor. The ambient light sensor may adjust brightness of the display panel 641 based on brightness of ambient light. The proximity sensor may turn off the display panel 641 and/or a backlight when the mobile phone is moved to the ear. As a type of motion sensor, an accelerometer sensor may detect magnitude of acceleration in all directions (typically three axes). The accelerometer sensor may detect magnitude and a direction of gravity when the mobile phone is at rest. The accelerometer sensor may be used for applications that identifies postures of the phone (such as horizontal and vertical screen switching, related games, magnetometer posture calibration), vibration recognition related functions (such as pedometer, tapping), and so on. Other sensors that can be configured for the mobile phone, such as a gyroscope, a barometer, a hygrometer, a thermometer, an infrared sensor, and so on, will not be described in detail herein.

The audio circuit 660, the speaker 661, and the microphone 662 may provide an audio interface between the user and the mobile phone. The audio circuit 660 may transmit electrical signals, which are converted from received audio data, to the speaker 661. On the other hand, the microphone 662 converts the collected audio signals into electrical signals. The electrical signals may be received by the audio circuit 660 and converted into audio data. The audio data may be output to and processed by the processor 680, and may be transmitted via the RF circuit 610 to another mobile phone. Alternatively, the audio data is output to the memory 620 for further processing.

WiFi is a short-range wireless transmission technology. The WiFi module 670 of the mobile phone allows the user to send and receive emails, browse websites, and access streaming media, and so on. The WiFi module 670 provides wireless broadband internet access for the user. Although the WiFi module 670 is illustrated in FIG. 6, it is understood that the WiFi module 670 is not a mandatory component of the mobile phone and may be omitted as required as long as the essence of the present disclosure is not changed.

The processor 680 is a control center of the mobile phone and connects various parts of the mobile phone using various interfaces and lines to perform various functions of the phone and to process data by running or executing software programs and/or modules stored in the memory 620 and by invoking data stored in the memory 620, such that the mobile phone may be monitored. In some embodiments, the processor 680 may include one or more processing units. In some embodiments, the processor 680 may integrate an application processor and a modem processor. The application processor primarily processes the operating system, user interfaces and applications, and so on. The modem processor primarily processes wireless communication. It shall be understood that the above modem processor may alternatively not be integrated into the processor 680.

The mobile phone further includes the power supply 690 (such as a battery) to supply power to various components. In some embodiments, the power supply may be logically connected to the processor 680 via a power management system, such that functions, such as charging management, discharging management, and power consumption management, may be achieved via the power management system. Although not shown, the mobile phone may further include a camera, a Bluetooth module, and so on, which will not be described here.

In the present disclosure, the processor 680 is configured to determine the SSB burst set. The SSB burst set includes N candidate SSB locations. Each of the N candidate SSB locations corresponds to one candidate SSB index. The N is an integer greater than 20. The processor 680 is configured to determine the QCL relationship of the N candidate SSB indexes based on the first indication information.

In some embodiments, the QCL relationship includes the following.

The first SSB index corresponds to M first candidate SSB indexes in the N candidate SSB indexes. The M first candidate SSB indexes have the same QCL relationship. The M is an integer greater than or equal to 1 and less than or equal to N.

In some embodiments, the first indication information indicates the Q value.

The processor 680 is configured to determine the QCL relationship of the N candidate SSB indexes according to the first formula, or to determine that the M first candidate SSB indexes have the same QCL relationship according to the first formula.

The first formula includes: the first SSB index=mod (the first candidate SSB index, the first indication information). The mod ( ) denotes the modulo operation, and the first SSB index includes 0, 1, . . . , Q−1.

In some embodiments, the first indication information indicates the Q value. When the Q value is less than or equal to 8, and the Q is a positive integer.

The processor 680 is configured to determine the QCL relationship of the N candidate SSB indexes according to the second formula, or to determine that the M first candidate SSB indexes have the same QCL relationship according to the second formula.

The second formula includes: the first SSB index=mod (DMRS sequence index of the PBCH corresponding to the first candidate SSB index, the first indication information). The mod ( ) denotes the modulo operation.

In some embodiments, the RF circuit 610 is configured to receive the second indication information. The second indication information is configured to indicate the SSB index that is transmitted and is included in the SSB burst set. The second indication information includes N bits, or, the second indication information includes (L+C) bits. The L*C=N, and each of the L and the C is a positive integer.

In some embodiments, the second indication information includes N bits, the N bits and the N candidate SSB indexes are in one-to-one correspondence.

Alternatively, the second indication information includes (L+C) bits. The N candidate SSB indexes are grouped into L groups. Each of the L groups includes C candidate SSB indexes. The L bits and the L groups are in one-to-one correspondence, and the C bits and the C candidate SSB indexes in each group are in one-to-one correspondence.

In some embodiments, the first indication information indicates the Q value, the Q is an integer greater than or equal to 1 and less than or equal to N.

When the second indication information includes the N bits, first Q bits of the N bits are valid bits.

Alternatively, when the second indication information includes the (L+C) bits, valid bits of the (L+C) bits are determined according to at least one of the following.

When the Q is less than or equal to C, the first Q bits of the C bits are the valid bits.

When the Q is greater than C, the C bits are the valid bits, and first ceil(Q/C) bits of the L bits are the valid bits. The ceil(denotes a rounding up operation.

In some embodiments, the first indication information indicates the Q value, the Q is an integer greater than or equal to 1 and less than or equal to N. The second indication information includes (L+C) bits. When the Q is less than or equal to (L+C), the first Q bits of the (L+C) bits are the valid bits, and the C bits of the (L+C) bits are located before the L bits, or the L bits of the (L+C) bits are located before the C bits.

In some embodiments, the first indication information indicates the Q value, and the Q is an integer greater than or equal to 1 and less than or equal to N.

When the value of Q is 8, the number of transmittable first SSB indexes in the SSB burst set is less than or equal to 8.

When the value of Q is 16, the number of transmittable first SSB indexes in the SSB burst set is greater than 8 and less than or equal to 16.

When the value of Q is 32, the number of transmittable first SSB indexes in the SSB burst set is greater than 16 and less than or equal to 32.

When the value of Q is 64, the number of transmittable first SSB indexes in the SSB burst set is greater than 32 and less than or equal to 64.

In some embodiments, the first indication information indicates the Q value, and the Q is an integer greater than or equal to 1 and less than or equal to N.

When the value of Q is 16, the number of transmittable first SSB indexes in the SSB burst set is divisible by 2.

When the value of Q is 32, the number of transmittable first SSB indexes in the SSB burst set is divisible by 4.

When the value of Q is 64, the number of transmittable first SSB indexes in the SSB burst set is divisible by 8.

In some embodiments, when the value of Q is 64, the SSB burst set does not include candidate SSB indexes having the same QCL relationship.

In some embodiments, the first indication information indicates the M value.

The processor 680 is configured to determine the QCL relationship of the N candidate SSB indexes according to the third formula, or to determine that the M first candidate SSB indexes have the same QCL relationship according to the third formula.

The third formula includes: the first SSB index=the first candidate SSB index+r. The first SSB index includes (kM).

The r=0, 1, . . . , M−1; the k=0, 1, . . . , ceil(N/M)−1.

In some embodiments, the first SSB index corresponds to M consecutive first candidate SSB indexes of the N candidate SSB indexes.

In some embodiments, the first indication information indicates the value of M.

When the value of M is 8, the number of transmittable first SSB indexes in the SSB burst set is less than or equal to 8.

When the value of M is 4, the number of transmittable first SSB indexes in the SSB burst set is greater than 8 and less than or equal to 16.

When the value of M is 2, the number of transmittable first SSB indexes in the SSB burst set is greater than 16 and less than or equal to 32.

When the value of M is 1, the number of transmittable first SSB indexes in the SSB burst set is greater than 32 and less than or equal to 64.

In some embodiments, the first indication information indicates the value of M.

When the value of M is 4, the number of transmittable first SSB indexes in the SSB burst set is divisible by 2.

When the value of M is 2, the number of transmittable first SSB indexes in the SSB burst set is divisible by 4.

When the value of M is 1, the number of transmittable first SSB indexes in the SSB burst set is divisible by 8.

In some embodiments, when the value of M is 1, the SSB burst set does not include candidate SSB indexes having the same QCL relationship.

In some embodiments, the second indication information is transmitted by the network device via the system message SIB1 or via a high level configuration parameter.

In some embodiments, the first indication information is transmitted by the network device via the system message MIB or SIB1 or PBCH. In some embodiments, the first indication information is transmitted by the network device via the high level configuration parameter. In some embodiments, the first indication information is predefined.

In some embodiments, the N is 64 or 128.

In some embodiments, the SSB burst set corresponds to a subcarrier spacing of 120 kHz, the value of N is 128, and/or, a length of a transmission window corresponding to the SSB burst set is 10 ms.

Figure 7:
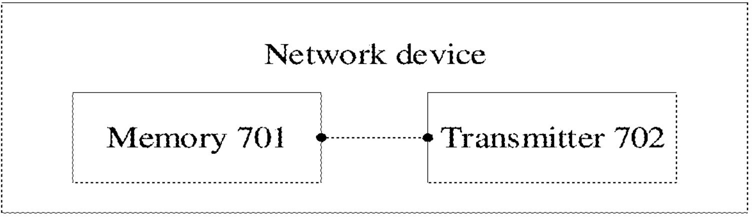
FIG. 7 is a schematic view of a network device according to another embodiment of the present disclosure.

Corresponding to the method of at least one of the above embodiments applied to the network device, the present disclosure further provides one or more network devices. The network device of the embodiments of the present disclosure may implement any of the above methods. As shown in FIG. 7, FIG. 7 is a schematic view of a network device according to another embodiment of the present disclosure. The network device may include following components.

A memory 701 and a transceiver 702 are included. The memory 701 is configured to execute program codes.

The transceiver 702 is configured to transmit first indication information to the terminal device. The first indication information is configured to determine the QCL relationship of the N candidate SSB indexes. The N candidate SSB indexes correspond to N candidate SSB locations included in a SSB burst set. The N is an integer greater than 20.

In some embodiments, the QCL relationship includes the following.

The first SSB index corresponds to M first candidate SSB indexes in the N candidate SSB indexes. The M first candidate SSB indexes have the same QCL relationship. The M is an integer greater than or equal to 1 and less than or equal to N.

In some embodiments, the first indication information indicates the Q value. The first indication information is configured to determine the QCL relationship of the N candidate SSB indexes according to the first formula, or to determine that the M first candidate SSB indexes have the same QCL relationship according to the first formula.

The first formula includes: the first SSB index=mod (the first candidate SSB index, the first indication information). The mod ( ) denotes the modulo operation, and the first SSB index includes 0, 1, . . . , Q−1.

In some embodiments, the first indication information indicates the Q value. When the Q value is less than or equal to 8, and the Q is a positive integer. The first indication information is configured to determine the QCL relationship of the N candidate SSB indexes according to the second formula, or to determine that the M first candidate SSB indexes have the same QCL relationship according to the second formula.

The second formula includes: the first SSB index=mod (DMRS sequence index of the PBCH corresponding to the first candidate SSB index, the first indication information). The mod ( ) denotes the modulo operation.

In some embodiments, the transceiver 702 is further configured to transmit the second indication information to the terminal device. The second indication information is configured to indicate the SSB index that is transmitted and is included in the SSB burst set. The second indication information includes N bits, or, the second indication information includes (L+C) bits. The L*C=N, and each of the L and the C is a positive integer.

In some embodiments, the second indication information includes N bits, the N bits and the N candidate SSB indexes are in one-to-one correspondence.

Alternatively, the second indication information includes (L+C) bits. The N candidate SSB indexes are grouped into L groups. Each of the L groups includes C candidate SSB indexes. The L bits and the L groups are in one-to-one correspondence, and the C bits and the C candidate SSB indexes in each group are in one-to-one correspondence.

In some embodiments, the first indication information indicates the Q value, the Q is an integer greater than or equal to 1 and less than or equal to N.

When the second indication information includes the N bits, first Q bits of the N bits are valid bits.

Alternatively, when the second indication information includes the (L+C) bits, valid bits of the (L+C) bits are determined according to at least one of the following.

When the Q is less than or equal to C, the first Q bits of the C bits are the valid bits.

When the Q is greater than C, the C bits are the valid bits, and first ceil(Q/C) bits of the L bits are the valid bits. The ceil( ) denotes a rounding up operation.

In some embodiments, the first indication information indicates the Q value, the Q is an integer greater than or equal to 1 and less than or equal to N. The second indication information includes (L+C) bits. When the Q is less than or equal to (L+C), the first Q bits of the (L+C) bits are the valid bits, and the C bits of the (L+C) bits are located before the L bits, or the L bits of the (L+C) bits are located before the C bits.

In some embodiments, the first indication information indicates the Q value, and the Q is an integer greater than or equal to 1 and less than or equal to N.

When the value of Q is 8, the number of transmittable first SSB indexes in the SSB burst set is less than or equal to 8.

When the value of Q is 16, the number of transmittable first SSB indexes in the SSB burst set is greater than 8 and less than or equal to 16.

When the value of Q is 32, the number of transmittable first SSB indexes in the SSB burst set is greater than 16 and less than or equal to 32.

When the value of Q is 64, the number of transmittable first SSB indexes in the SSB burst set is greater than 32 and less than or equal to 64.

In some embodiments, the first indication information indicates the Q value, and the Q is an integer greater than or equal to 1 and less than or equal to N.

When the value of Q is 16, the number of transmittable first SSB indexes in the SSB burst set is divisible by 2.

When the value of Q is 32, the number of transmittable first SSB indexes in the SSB burst set is divisible by 4.

When the value of Q is 64, the number of transmittable first SSB indexes in the SSB burst set is divisible by 8.

In some embodiments, when the value of Q is 64, the SSB burst set does not include candidate SSB indexes having the same QCL relationship.

In some embodiments, the first indication information indicates the M value. The first indication information is configured to determine the QCL relationship of the N candidate SSB indexes according to the third formula, or to determine that the M first candidate SSB indexes have the same QCL relationship according to the third formula.

The third formula includes: the first SSB index=the first candidate SSB index+r. The first SSB index includes (kM). The r=0, 1, . . . , M−1; the k=0, 1, . . . , ceil(N/M)−1.

In some embodiments, the first SSB index corresponds to M consecutive first candidate SSB indexes of the N candidate SSB indexes.

In some embodiments, the first indication information indicates the value of M.

When the value of M is 8, the number of transmittable first SSB indexes in the SSB burst set is less than or equal to 8.

When the value of M is 4, the number of transmittable first SSB indexes in the SSB burst set is greater than 8 and less than or equal to 16.

When the value of M is 2, the number of transmittable first SSB indexes in the SSB burst set is greater than 16 and less than or equal to 32.

When the value of M is 1, the number of transmittable first SSB indexes in the SSB burst set is greater than 32 and less than or equal to 64.

In some embodiments, the first indication information indicates the value of M.

When the value of M is 4, the number of transmittable first SSB indexes in the SSB burst set is divisible by 2.

When the value of M is 2, the number of transmittable first SSB indexes in the SSB burst set is divisible by 4.

When the value of M is 1, the number of transmittable first SSB indexes in the SSB burst set is divisible by 8.

In some embodiments, when the value of M is 1, the SSB burst set does not include candidate SSB indexes having the same QCL relationship.

In some embodiments, the second indication information is transmitted by the network device via the system message SIB1 or via a high level configuration parameter.

In some embodiments, the first indication information is transmitted by the network device via the system message MIB or SIB1 or PBCH. In some embodiments, the first indication information is transmitted by the network device via the high level configuration parameter. In some embodiments, the first indication information is predefined.

In some embodiments, the N is 64 or 128.

In some embodiments, the SSB burst set corresponds to a subcarrier spacing of 120 kHz, the value of N is 128, and/or, a length of a transmission window corresponding to the SSB burst set is 10 ms.

All or part of the above embodiments can be achieved by software, hardware, firmware or any combination thereof.

When the devices in the above are achieved by software, all or part of the device may be implemented in the form of a computer program product. The computer program product includes one or more computer instructions. When loading and executing the computer program instructions on the computer, all or part of the processes or functions illustrated in the embodiment of the present disclosure may be achieved. The computer may be a general-purpose computer, a dedicated computer, a computer network, or other programmable devices. The computer instructions may be stored in a computer-readable storage medium or transmitted from one computer-readable storage medium to another computer-readable storage medium. The computer-readable storage medium may include a non-transitory computer-readable storage medium. The computer instructions can be configured to, when being run on the computer, cause the computer to perform operations of the present disclosure. For example, the computer instructions may be transmitted from one website, one computer, one server or data center to another via wired means (such as coaxial cables, optical fibers, digital subscriber lines (DSL)) or wireless means (such as infrared, wireless, microwave, and so on). The computer-readable storage medium may be any usable medium which can be stored on a computer, or may be a data storage device such as a server, a data center that integrates one or more usable media. The usable media may be magnetic media, (such as floppy disks, hard disks, magnetic tapes), optical media (such as DVDs), or semiconductor media (such as Solid State Disk (SSD)), and so on.

Terms “first”, “second”, “third”, “fourth”, and so on, in the specification, claims, and accompanying drawings of the present disclosure are used to distinguish similar objects, and are not necessarily used to describe a particular order or sequence. It shall be understood that the data so used may be interchangeable where appropriate, such that the embodiments described herein can be implemented in an order other than what is illustrated or described herein. Furthermore, terns “include”, “have”, and any variation thereof, are used to cover non-exclusive inclusion. For example, a process, a method, a system, a product or an apparatus including a series of operations or units are not limited to the listed operations or units, but may include other operations or units not explicitly listed but inherently included in the process, the method, the system, the product or the apparatus.

What is claimed is:

1. A method of receiving a synchronous signal block (SSB), comprising:

determining, by a terminal device, an SSB burst set, wherein the SSB burst set comprises N candidate SSB locations, each of the N candidate SSB locations corresponds to a respective one of N candidate SSB indexes, the N is an integer greater than 20;

determining, by the terminal device, a quasi co-location (QCL) relationship of the N candidate SSB indexes based on first indication information, wherein the QCL relationship comprises: a first SSB index corresponding to M first candidate SSB indexes in the N candidate SSB indexes, wherein the M first candidate SSB indexes have a same QCL relationship, and the M is an integer greater than or equal to 1 and less than or equal to N; and receiving, by the terminal device, second indication information, wherein the second indication information is configured to indicate an SSB index that is to be transmitted in the SSB burst set, the second indication information comprises N bits, or, the second indication information comprises (L+C) bits, L*C=N, and each of L and C is a positive integer;

wherein the first indication information indicates a Q value, the Q is an integer greater than or equal to 1 and less than or equal to N, and wherein, in response to the second indication information comprising the N bits, first Q bits of the N bits are valid bits; or in response to the second indication information comprising the (L+C) bits, valid bits of the (L+C) bits are determined according to at least one of: in response to the Q being less than or equal to C, the first Q bits of the C bits are the valid bits; or in response to the Q being greater than C, the C bits are the valid bits, and first ceil(Q/C) bits of the L bits are the valid bits, wherein ceil( ) denotes a rounding up operation.

2. The method according to claim 1, wherein the first indication information indicates a Q value, and the determining a quasi co-location (QCL) relationship of the N candidate SSB indexes based on the first indication information, comprises:

determining, by the terminal device, the QCL relationship of the N candidate SSB indexes according to a first formula, or determining that the M first candidate SSB indexes have the same QCL relationship according to the first formula, wherein the first formula comprises: for any of the M first candidate SSB indexes, the first SSB index=mod (the first candidate SSB index, the first indication information), and the mod ( ) denotes a modulo operation, and the first SSB index is one of 0, 1, . . . , Q−1.

3. The method according to claim 1, wherein the first indication information indicates a Q value; and in response to the Q value being less than or equal to 8 and being a positive integer, the determining a quasi co-location (QCL) relationship of the N candidate SSB indexes based on the first indication information, comprises:

determining, by the terminal device, the QCL relationship of the N candidate SSB indexes according to a second formula, or determining, by the terminal device, that the M first candidate SSB indexes have the same QCL relationship according to the second formula, wherein the second formula comprises: for any of the M first candidate SSB indexes, the first SSB index=mod (a demodulation reference signal (DMRS) sequence index of a physical broadcast channel (PBCH) corresponding to the first candidate SSB index, the first indication information), and the mod ( ) denotes a modulo operation.

4. The method according to claim 1, wherein the second indication information comprises the N bits, wherein the N bits and the N candidate SSB indexes are in a one-to-one correspondence; or the second indication information comprises the (L+C) bits, the N candidate SSB indexes are grouped into L groups, each of the L groups includes C candidate SSB indexes, the L bits and the L groups are in one-to-one correspondence, and the C bits and the C candidate SSB indexes in each group are in one-to-one correspondence.

5. The method according to claim 1, wherein the second indication information comprises the (L+C) bits; and in response to the Q being less than or equal to (L+C), first Q bits of the (L+C) bits are valid bits, wherein the C bits of the (L+C) bits are located before the L bits, or the L bits of the (L+C) bits are located before the C bits.

6. The method according to claim 2, wherein the first indication information indicates the Q value, and the Q is an integer greater than or equal to 1 and less than or equal to N, in response to the Q value being 8, a number of transmittable first SSB indexes in the SSB burst set is less than or equal to 8;

in response to the Q value being 16, the number of transmittable first SSB indexes in the SSB burst set is greater than 8 and less than or equal to 16;

in response to the Q value being 32, the number of transmittable first SSB indexes in the SSB burst set is greater than 16 and less than or equal to 32; and in response to the Q value being 64, the number of transmittable first SSB indexes in the SSB burst set is greater than 32 and less than or equal to 64.

7. The method according to claim 2, wherein in response to the Q value being 64, the SSB burst set excludes candidate SSB indexes having the same QCL relationship.

8. The method according to claim 1, wherein the first indication information indicates a value for M, and the determining a QCL relationship of the N candidate SSB indexes based on the first indication information, comprises:

determining, by the terminal device, the QCL relationship of the N candidate SSB indexes according to a third formula, or determining that the M first candidate SSB indexes have the same QCL relationship according to the third formula;

wherein the third formula comprises: the first SSB index=the first candidate SSB indexes+r, the first SSB index comprises (kM), wherein the r=0, 1, . . . , M−1, k=0, 1, . . . , ceil(N/M)−1.

9. The method according to claim 8, wherein the first indication information indicates a value of the M, wherein, in response to the value of M being 8, a number of transmittable first SSB indexes in the SSB burst set is less than or equal to 8;

in response to the value of M being 4, the number of transmittable first SSB indexes in the SSB burst set is greater than 8 and less than or equal to 16;

in response to the value of M being 2, the number of transmittable first SSB indexes in the SSB burst set is greater than 16 and less than or equal to 32; and in response to the value of M being 1, the number of transmittable first SSB indexes in the SSB burst set is greater than 32 and less than or equal to 64.

10. The method according to claim 8, wherein in response to the value of M being 1, the SSB burst set excludes candidate SSB indexes having the same QCL relationship.

11. A method of transmitting a synchronous signal block (SSB), comprising:

transmitting, by a network device, first indication information to a terminal device, wherein the first indication information is configured to determine a quasi co-location (QCL) relationship of N candidate SSB indexes, the N candidate SSB indexes correspond to N candidate SSB locations, the N is an integer greater than 20, wherein the QCL relationship comprises: a first SSB index corresponding to M first candidate SSB indexes in the N candidate SSB indexes, wherein the M first candidate SSB indexes have a same QCL relationship, the M is an integer greater than or equal to 1 and less than or equal to N; and transmitting, by the network device, second indication information to the terminal device, wherein the second indication information is configured to indicate an SSB index that is to be transmitted in a SSB burst set, the second indication information comprises N bits, or, the second indication information comprises (L+C) bits, L*C=N, and each of L and C is a positive integer, wherein the first indication information indicates a Q value, the Q is an integer greater than or equal to 1 and less than or equal to N, and wherein, in response to the second indication information comprising the N bits, first Q bits of the N bits are valid bits; or in response to the second indication information comprising the (L+C) bits, valid bits of the (L+C) bits are determined according to at least one of: in response to the Q being less than or equal to C, the first Q bits of the C bits are the valid bits; or in response to the Q being greater than C, the C bits are the valid bits, and first ceil(Q/C) bits of the L bits are the valid bits, wherein ceil( ) denotes a rounding up operation.

12. The method according to claim 11, wherein the first indication information indicates a Q value, and the first indication information is configured to determine the QCL relationship of the N candidate SSB indexes according to a first formula, or to determine that the M first candidate SSB indexes have the same QCL relationship according to the first formula, wherein the first formula comprises: for any of the M first candidate SSB indexes, the first SSB index=mod (the first candidate SSB index, the first indication information), and the mod ( ) denotes a modulo operation, and the first SSB index is one of: 0, 1, . . . , Q−1.

13. The method according to claim 11, wherein the first indication information indicates a Q value; and in response to the Q value being less than or equal to 8 and being a positive integer, the first indication information is configured to determine the QCL relationship of the N candidate SSB indexes according to a second formula, or to determine that the M first candidate SSB indexes have the same QCL relationship according to the second formula, wherein the second formula comprises: for any of the M first candidate SSB indexes, the first SSB index=mod (a demodulation reference signal (DMRS) sequence index of a physical broadcast channel (PBCH) corresponding to the first candidate SSB index, the first indication information), and the mod ( ) denotes a modulo operation.

14. The method according to claim 11, wherein the second indication information comprises the N bits, wherein the N bits and the N candidate SSB indexes are in a one-to-one correspondence; or the second indication information comprises the (L+C) bits, the N candidate SSB indexes are grouped into L groups, each of the L groups includes C candidate SSB indexes, the L bits and the L groups are in one-to-one correspondence, and the C bits and the C candidate SSB indexes in each group are in one-to-one correspondence.

15. A non-transitory computer-readable storage medium, comprising instructions, wherein the instructions are configured to, when being run on a computer, cause the computer to perform operations of:

determining, by a terminal device, an SSB burst set, wherein the SSB burst set comprises N candidate SSB locations, each of the N candidate SSB locations corresponds to a respective one of N candidate SSB indexes, the N is an integer greater than 20; and determining, by the terminal device, a quasi co-location (QCL) relationship of the N candidate SSB indexes based on first indication information, wherein the QCL relationship comprises: a first SSB index corresponding to M first candidate SSB indexes in the N candidate SSB indexes, wherein the M first candidate SSB indexes have a same QCL relationship, the M is an integer greater than or equal to 1 and less than or equal to N; and receiving, by the terminal device, second indication information, wherein the second indication information is configured to indicate an SSB index that is to be transmitted in the SSB burst set, the second indication information comprises N bits, or, the second indication information comprises (L+C) bits, L*C=N, and each of L and C is a positive integer;

wherein the first indication information indicates a Q value, the Q is an integer greater than or equal to 1 and less than or equal to N, and wherein, in response to the second indication information comprising the N bits, first Q bits of the N bits are valid bits; or in response to the second indication information comprising the (L+C) bits, valid bits of the (L+C) bits are determined according to at least one of: in response to the Q being less than or equal to C, the first Q bits of the C bits are the valid bits; or in response to the Q being greater than C, the C bits are the valid bits, and first ceil(Q/C) bits of the L bits are the valid bits, wherein ceil( ) denotes a rounding up operation.

* * * * *